United States Patent
Gong et al.

(10) Patent No.: US 12,075,500 B2
(45) Date of Patent: Aug. 27, 2024

(54) VIRTUAL CARRIER AND VIRTUAL CONNECTION AGGREGATION

(71) Applicant: Huawei Technologies Co., Ltd., Shenzhen (CN)

(72) Inventors: Zhengwei Gong, Ottawa (CA); Amine Maaref, Ottawa (CA); Mohammadhadi Baligh, Ottawa (CA); Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 16/679,616

(22) Filed: Nov. 11, 2019

(65) Prior Publication Data

US 2020/0112959 A1 Apr. 9, 2020

Related U.S. Application Data

(63) Continuation of application No. PCT/CN2018/086714, filed on May 14, 2018.

(Continued)

(51) Int. Cl.
*H04W 76/15* (2018.01)
*H04L 1/1812* (2023.01)
(Continued)

(52) U.S. Cl.
CPC ........... *H04W 76/15* (2018.02); *H04L 1/1819* (2013.01); *H04L 5/0092* (2013.01);
(Continued)

(58) Field of Classification Search
CPC ............. H04W 72/0453; H04W 76/11; H04W 72/042; H04W 72/0446; H04W 80/02;
(Continued)

(56) References Cited

U.S. PATENT DOCUMENTS

| | | | | |
|---|---|---|---|---|
| 2011/0034175 A1* | 2/2011 | Fong | ................... | H04W 72/042 455/450 |
| 2013/0010619 A1* | 1/2013 | Fong | ................. | H04W 72/0453 370/252 |

(Continued)

FOREIGN PATENT DOCUMENTS

| | | |
|---|---|---|
| CN | 103125134 A | 5/2013 |
| CN | 104301273 A | 1/2015 |
| CN | 106658719 A | 5/2017 |

OTHER PUBLICATIONS

Iwamura, M., "Carrier Aggregation Framework in 3GPP LTE-Advanced", WiMAX/LTE Update, IEEE Communications Magazine, XP11315996A, 8 Pages, Aug. 2010.

(Continued)

*Primary Examiner* — Xuan Lu
(74) *Attorney, Agent, or Firm* — Slater Matsil, LLP

(57) ABSTRACT

Carrier aggregation and dual connectivity leverage multiple component carriers to increase the effective bandwidth available to a given UE. Embodiments of this disclosure extend the concept of carrier aggregation and dual connectivity by using a physical component carrier and one or more virtual component carriers from one physical component carrier group and/or one virtual component carrier group, which have the same carrier frequency and carrier bandwidth as the physical component carrier, to transmit data streams to a user equipment. Data streams communicated over the physical component carrier and the virtual component carrier(s) may be orthogonal in the time domain or code domain. Alternatively, data streams communicated over the physical component carrier and the virtual component carrier(s) may be non-orthogonal, in which case the UE may need to decode the respective data streams using non-orthogonal signal processing techniques.

27 Claims, 14 Drawing Sheets

Related U.S. Application Data

(60) Provisional application No. 62/506,462, filed on May 15, 2017.

(51) Int. Cl.
| | | |
|---|---|---|
| *H04L 1/1822* | (2023.01) | |
| *H04L 5/00* | (2006.01) | |
| *H04L 27/26* | (2006.01) | |
| *H04W 72/0446* | (2023.01) | |
| *H04W 72/0453* | (2023.01) | |
| *H04W 72/23* | (2023.01) | |
| *H04W 76/11* | (2018.01) | |
| *H04W 80/02* | (2009.01) | |
| *H04W 80/08* | (2009.01) | |

(52) U.S. Cl.
CPC ........ *H04L 5/0094* (2013.01); *H04L 27/2602* (2013.01); *H04L 27/2607* (2013.01); *H04W 72/0446* (2013.01); *H04W 72/0453* (2013.01); *H04W 72/23* (2023.01); *H04W 76/11* (2018.02); *H04W 80/02* (2013.01); *H04W 80/08* (2013.01)

(58) Field of Classification Search
CPC .... H04W 80/08; H04L 1/1819; H04L 5/0092; H04L 5/0094; H04L 27/2607
USPC ......................................................... 370/329
See application file for complete search history.

(56) References Cited

U.S. PATENT DOCUMENTS

| | | | | |
|---|---|---|---|---|
| 2014/0011506 A1* | 1/2014 | McNamara | ........... | H04L 5/0039 455/450 |
| 2014/0044027 A1* | 2/2014 | Beale | ................... | H04W 56/00 370/311 |
| 2014/0056243 A1* | 2/2014 | Pelletier | ............ | H04W 72/1268 370/329 |
| 2015/0341911 A1* | 11/2015 | Wakabayashi | ........ | H04L 5/0032 370/329 |
| 2016/0037450 A1* | 2/2016 | Richards | ............... | H04W 76/27 370/311 |
| 2016/0134351 A1* | 5/2016 | Choi | .................... | H04B 7/0619 370/328 |
| 2016/0150586 A1 | 5/2016 | Lei et al. | | |
| 2016/0192352 A1* | 6/2016 | Han | ...................... | H04W 12/06 370/329 |
| 2016/0278032 A1* | 9/2016 | Yi | .......................... | H04L 69/324 |
| 2016/0330740 A1 | 11/2016 | Uchino et al. | | |
| 2016/0345347 A1* | 11/2016 | Cheng | ..................... | H04L 25/00 |
| 2017/0019944 A1 | 1/2017 | Teng et al. | | |
| 2017/0142751 A1* | 5/2017 | Liu | .................. | H04W 74/0816 |
| 2017/0171786 A1* | 6/2017 | Mochizuki | ...... | H04W 36/00835 |
| 2018/0316452 A1* | 11/2018 | Chen | .................... | H04B 7/0413 |

OTHER PUBLICATIONS

Intel Corporation, "HARQ aspects for carrier aggregation", 3GPP TSG RAN WG1 Meeting #88bis, R1-1704769, Apr. 3-7, 2017, 4 Pages, Spokane, USA.

CATT, "Consideration on Component Carrier Index", 3GPP TSG RAN WG2 meeting #68bis, R2-100060, January 18-22, 2010, 4 pages, Valencia, Spain.

Nokia et al., "Introduction of Carrier aggregation enhancements", 3GPP TSG-RAN2 Meeting #79, R2-124366, Aug. 13-17, 2012, 18 Pages, Qingdao, China.

Sony, "LTE-NR Coexistence", 3GPP TSG RAN WG2 Meeting #97bis, R2-1703279, Apr. 3-7, 2017, 2 Pages, Spokane, USA.

\* cited by examiner

VIRTUAL CARRIER AND VIRTUAL CONNECTION AGGREGATION

CROSS-REFERENCE TO RELATED APPLICATIONS

This patent application is a continuation of International Application PCT/CN2018/086714 filed on May 14, 2018, entitled "Virtual Carrier and Virtual Connection Aggregation," which claims priority to U.S. Provisional Application No. 62/506,462 filed on May 15, 2017, both of which are hereby incorporated by reference herein as if reproduced in their entireties.

TECHNICAL FIELD

Embodiments of the present disclosure relate to the field of wireless network communications, and, in particular embodiments, to a system and method for virtual carrier and virtual connection aggregation.

BACKGROUND

Next-generation wireless networks will need to provide higher throughput to support greater numbers of subscribers as well as applications requiring high data rates, such as video, high-definition images, and the like. Various techniques are available to increase the overall throughput provided to mobile devices in a wireless network. For example, carrier aggregation and dual connectivity techniques transmit data to a user equipment (UE) over multiple component carriers at the same time, thereby increasing the bandwidth available to the UE. In addition, one component carrier is also associated with one cell or serving cell with specific cell ID and carrier frequency in LTE. Generally, one component carrier with specific cell ID and specific carrier frequency can also be regarded as one physical component carrier. Moreover, each physical component carrier can be associated with one primary cell (PCell) or secondary cell (SCell).

The difference between carrier aggregation and dual connectivity lies primarily in the degree to which data transmissions over the component carriers are synchronized and/or coordinated. Carrier aggregation is typically used when a single transmit point is transmitting data over the aggregated carriers, or otherwise when multiple transmit points connected by a low-latency backhaul link (e.g., a near ideal backhaul link) are transmitting data streams over the aggregated carriers belonging to one carrier group (e.g., master cell group, MCG). In contrast, dual connectivity is typically used when multiple transmit points that are connected by a higher latency backhaul link (e.g., a non-ideal backhaul link) are transmitting data streams over the aggregated carriers belonging to two different carrier groups (e.g., both master cell group, MCG and secondary cell group, SCG).

SUMMARY

Example embodiments of the present disclosure which provide a system and method for virtual carrier and virtual connection aggregation.

In accordance with an embodiment, a method for receiving data is provided. In this example, the method includes receiving a first data stream over a physical component carrier and a second data stream over a virtual component carrier. The physical component carrier and the virtual component carrier have the same carrier frequency and the same carrier bandwidth. The physical component carrier and the virtual component carrier belong to the same component carrier group and are assigned different carrier indices.

Optionally, in any of the previous embodiments, the physical component carrier and the virtual component carrier are associated with a common media access control (MAC) sublayer, a common radio link control (RLC) sublayer, and a common packet data convergence protocol (PDCP) sublayer.

Optionally, in any of the previous embodiments, the physical component carrier and the virtual component carrier are associated with the same physical cell identifier (PCI).

Optionally, in any of the previous embodiments, the physical component carrier and the virtual component carrier are associated with the same timing advance group (TAG).

Optionally, in any of the previous embodiments, the physical component carrier and the virtual component carrier are associated with the same cyclic prefix (CP) duration.

Optionally, in any of the previous embodiments, the physical component carrier and the virtual component carrier are associated with the same sub-carrier spacing.

Optionally, in any of the previous embodiments, the physical component carrier and the virtual component carrier are associated with the same bandwidth partition.

Optionally, in any of the previous embodiments, a frame communicated over the physical component carrier is aligned in the time domain with a frame communicated over the virtual component carrier.

Optionally, in any of the previous embodiments, subframes in the frame communicated over the physical component carrier are aligned in the time domain with subframes in the frame communicated over the virtual component carrier, the frame communicated over the physical component carrier carrying the same number of subframes as the frame communicated over the virtual component carrier, wherein pairs of subframes, transmitted over the respective physical and virtual component carriers, that align in the time domain are associated with the same subframe index.

Optionally, in any of the previous embodiments, at least one of a physical downlink control channel (PDCCH), a physical downlink shared channel (PDSCH), a physical uplink control channel (PUCCH), and a physical uplink shared channel (PUSCH) in the frame communicated over the physical component carrier has a different duration than corresponding one of a PDCCH, a PDSCH, a PUCCH, and a PUSCH in the frame communicated over the virtual component carrier.

Optionally, in any of the previous embodiments, the last symbol of a physical downlink control channel (PDCCH) in the frame communicated over physical component carrier may not align in the time domain with the last symbol of a PDCCH in the frame communicated over the virtual component carrier.

Optionally, in any of the previous embodiments, at least one of a first symbol and a last symbol of a physical downlink shared channel (PDSCH) in the frame communicated over the physical component carrier may not align in the time domain with a corresponding one of a first symbol and a last symbol of a PDSCH in the frame communicated over the virtual component carrier.

Optionally, in any of the previous embodiments, at least one of a first symbol and a last symbol of a physical uplink control channel (PUCCH) in the frame communicated over the physical component carrier may not align in the time domain with a corresponding one of a first symbol and a last symbol of a PUCCH in the frame communicated over the virtual component carrier.

Optionally, in any of the previous embodiments, at least one of a first symbol and a last symbol of a physical uplink shared channel (PUSCH) in the frame communicated over the physical component carrier may not align in the time domain with a corresponding one of a first symbol and a last symbol of a PUSCH in the frame communicated over the virtual component carrier.

Optionally, in any of the previous embodiments, the frame communicated over the physical component carrier and the frame communicated over the virtual component carrier share a common downlink synchronization channel (SCH).

Optionally, in any of the previous embodiments, the frame communicated over the physical component carrier and the frame communicated over the virtual component carrier share a common physical broadcast channel (PBCH).

Optionally, in any of the previous embodiments, the frame communicated over the physical component carrier and the frame communicated over the virtual component carrier share a common search space in a physical downlink control channel (PDCCH).

Optionally, in any of the previous embodiments, the frame communicated over the physical component carrier and the frame communicated over the virtual component carrier share a downlink control information (DCI) message without blind detection.

Optionally, in any of the previous embodiments, the DCI message may indicate a starting or ending symbol location for at least one of a PDCCH, a PDSCH, a PUCCH, and a PUSCH in the frame communicated over the physical component carrier; and the method may further include determining that the starting or ending symbol location indicated by the DCI message carried by the frame communicated over the physical component carrier also indicates a starting or ending symbol location for at least one of a PDCCH, a PDSCH, a PUCCH, and a PUSCH in the frame communicated over the virtual component carrier when the starting or ending symbol location for a corresponding one of the PDCCH, the PDSCH, the PUCCH, and the PUSCH in the frame communicated over the virtual component carrier has not been configured via higher layer signaling.

Optionally, in any of the previous embodiments, the UE may not receive an uplink grant for resources in a physical uplink shared channel (PUSCH) of the frame communicated over the virtual component carrier.

Optionally, in any of the previous embodiments, the physical component carrier may have an associated first maximum number of HARQ processes, independently of a number of active HARQ processes in the virtual component carrier, and the virtual component carrier has an associated second maximum number of HARQ processes, independently of a number of active HARQ processes in the physical component carrier.

Optionally, in any of the previous embodiments, the method may include transmitting a single physical uplink control channel (PUCCH) message, the PUCCH message including at least a first HARQ feedback bit indicating whether a codeword or code block carried by the first data stream was successfully decoded by the UE, and at least a second HARQ feedback bit indicating whether a codeword and/or code block carried by the second data stream was successfully decoded by the UE.

Optionally, in any of the previous embodiments, the total number of HARQ feedback bits in the PUCCH message may be based on a combined number of codewords and/or code blocks carried by data streams received over component carriers in a group of component carriers that includes the physical component carrier and the virtual component carrier.

Optionally, in any of the previous embodiments, the total number of HARQ feedback bits in the PUCCH message may be configured via higher layer signaling.

Optionally, in any of the previous embodiments, the PUCCH resource may be configured by RRC signaling.

Optionally, in any of the previous embodiments, the method may further include descrambling a first message carried by the first data stream according to a scrambling identity associated with a physical cell identifier (PCI) assigned to the physical component carrier, and descrambling a second message carried by the second data stream using either the scrambling identity associated with the PCI or a scrambling identity configured through higher layer signaling.

Optionally, in any of the previous embodiments, the first data stream is orthogonal to the second data stream in the code domain.

An apparatus for performing the above methods is also provided.

In accordance with another embodiment, a method for receiving data is provided. In this example, the method includes receiving a first data stream over a physical component carrier and a second data stream over a virtual component carrier, the physical component carrier and the virtual component carrier having the same carrier frequency and the same carrier bandwidth, wherein the physical component carrier belongs to a different component carrier group than the virtual component carrier. In one example, the physical component carrier and the virtual component carrier are associated with different media access control (MAC) sublayers, and/or different radio link control (RLC) sublayers, and/or different packet data convergence protocol (PDCP) sublayers. In the same example, or another example, the physical component carrier is associated with a physical component carrier group, and the virtual component carrier is associated with a virtual component carrier group. In any one of the above-mentioned examples, or in another example, the virtual component carrier group consists of virtual component carriers. In any one of the above-mentioned examples, or in another example, the physical component carrier group is associated with a different cell specific radio network temporary identity (C-RNTI) than the virtual component carrier group. In any one of the above-mentioned examples, or in another example, the physical component carrier group is associated with the same cell specific radio network temporary identity (C-RNTI) as the virtual component carrier group. In any one of the above-mentioned examples, or in another example, a frame communicated over the physical component carrier is aligned in the time domain with a frame communicated over the virtual component carrier. In any one of the above-mentioned examples, or in another example, subframes in the frame communicated over the physical component carrier are aligned in the time domain with subframes in the frame communicated over the virtual component carrier, the frame communicated over the physical component carrier carrying the same number of subframes as the frame communicated over the virtual component carrier, wherein pairs of subframes, transmitted over the respective physical and virtual component carriers, that align in the time domain are associated with the same subframe index. In any one of the above-mentioned examples, or in another example, at least one of a physical downlink control channel (PDCCH), a physical downlink shared channel (PDSCH), a physical uplink control channel (PUCCH), and a physical uplink shared channel (PUSCH) in the frame communicated over the physical component carrier has a different duration than corresponding one of a PDCCH, a PDSCH, a PUCCH, and a PUSCH in the frame communicated over the virtual component carrier. In any one of the above-mentioned examples, or in another example, a last symbol of a physical downlink control channel (PDCCH) in the frame communicated over physical component carrier does not align in the time domain with the last symbol of a PDCCH in the frame communicated over the virtual component carrier. In any one of the above-mentioned examples, or in another example, at least one of a first symbol and a last symbol of a physical downlink shared channel (PDSCH) in the frame communicated over the physical component carrier does not align in the time domain with a corresponding one of a first symbol and a last symbol of a PDSCH in the frame communicated over the virtual component carrier. In any one of the above-mentioned examples, or in another example, at least one of a first symbol and a last symbol of a physical uplink control channel (PUCCH) in the frame communicated over the physical component carrier does not align in the time domain with a corresponding one of a first symbol and a last symbol of a PUCCH in the frame communicated over the virtual component carrier. In any one of the above-mentioned examples, or in another example, at least one of a first symbol and a last symbol of a physical uplink shared channel (PUSCH) in the frame communicated over the physical component carrier does not align in the time domain with a corresponding one of a first symbol and a last symbol of a PUSCH in the frame communicated over the virtual component carrier. In any one of the above-mentioned examples, or in another example, the frame communicated over the physical component carrier and the frame communicated over the virtual component carrier share a common downlink synchronization channel (SCH). In any one of the above-mentioned examples, or in another example, the frame communicated over the physical component carrier and the frame communicated over the virtual component carrier share a common physical broadcast channel (PBCH). In any one of the above-mentioned examples, or in another example, the frame communicated over the physical component carrier and the frame communicated over the virtual component carrier share a common search space in a physical downlink control channel (PDCCH). In any one of the above-mentioned examples, or in another example, the frame communicated over the physical component carrier and the frame communicated over the virtual component carrier share a downlink control information (DCI) message without blind detection. In any one of the above-mentioned examples, or in another example, the method further includes decoding a downlink control information (DCI) message carried by the frame communicated over the physical component carrier, the DCI message indicating a starting or ending symbol location for at least one of a physical downlink control channel (PDCCH), a physical downlink shared channel (PDSCH), a physical uplink control channel (PUCCH), and a physical uplink shared channel (PUSCH) in the frame communicated over the physical component carrier, and determining that the starting or ending symbol location indicated by the DCI message carried by the frame communicated over the physical component carrier also indicates a starting or ending symbol location for at least one of a PDCCH, a PDSCH, a PUCCH, and a PUSCH in the frame communicated over the virtual component carrier when the starting or ending symbol location for a corresponding one of the PDCCH, the PDSCH, the PUCCH, and the PUSCH in the frame communicated over the virtual component carrier has not been configured via higher layer signaling. In any one of the above-mentioned examples, or in another example, the UE does not receive an uplink grant for resources in a physical uplink shared channel (PUSCH) of the frame communicated over the virtual component carrier. In any one of the above-mentioned examples, or in another example, the physical component carrier has an associated first maximum number of HARQ processes, independently of a number of active HARQ processes in the virtual component carrier, and the virtual component carrier has an associated second maximum number of HARQ processes, independently of a number of active HARQ processes in the physical component carrier. In any one of the above-mentioned examples, or in another example, the method further includes transmitting a single physical uplink control channel (PUCCH) message, the PUCCH message including at least a first HARQ feedback bit indicating whether a codeword or code block carried by the first data stream was successfully decoded by the UE, and at least a second HARQ feedback bit indicating whether a codeword and/or code block carried by the second data stream was successfully decoded by the UE. In any one of the above-mentioned examples, or in another example, one maximum number of HARQ process is associated with the number of parallel assignment for one unicast data channel which can be PUSCH or PDSCH. In any one of the above-mentioned examples, or in another example, one maximum number of HARQ process is associated with the number of parallel HARQ process assigned for one unicast data channel which can be PUSCH or PDSCH. The total number of HARQ feedback bits in the PUCCH message may be based on a combined number of codewords and/or code blocks carried by data streams received over component carriers in a group of component carriers that includes the physical component carrier and the virtual component carrier. The total number of HARQ feedback bits in the PUCCH message may be configured via higher layer signaling. The PUCCH resource may configured by RRC signaling.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
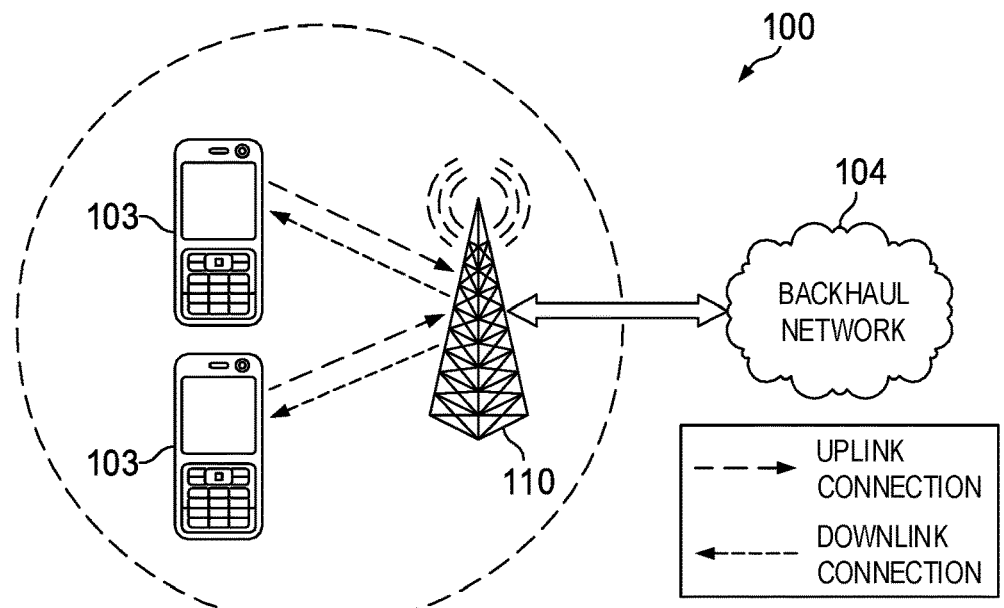
FIG. 1 is a diagram of a wireless network.

The making and using of specific embodiments are discussed in detail below. It should be appreciated, however, that the claimed concepts that can be embodied in a wide variety of specific contexts. The specific embodiments discussed are merely illustrative of specific ways to make and use the invention, and do not limit the scope of the invention. The terms "component carrier," "carrier," "aggregated carrier," and "aggregated component carrier," and "carrier group" are used interchangeably throughout this disclosure. A component carrier may be associated with a serving cell; A physical component carrier may be associated with a primary serving cell (PCell) with one cell ID, and a virtual component carrier may be associated with a virtual secondary cell (virtual SCell). A component carrier group may be associated with a serving cell group. For example, a physical component carrier group may be associated with a MSG and a virtual component carrier group may be associated with a virtual SCG.

As mentioned above, carrier aggregation and dual connectivity leverage multiple component carriers to increase the effective bandwidth available to a given UE. Embodiments of this disclosure extend the concept of carrier aggregation and dual connectivity by using a physical component carrier and one or more virtual component carriers from one physical component carrier group and/or one virtual component carrier group, which have the same carrier frequency and carrier bandwidth as the physical component carrier, to transmit data streams to a user equipment. Data streams communicated over the physical component carrier and the virtual component carrier(s) may be orthogonal in the time domain or code domain. Alternatively, data streams communicated over the physical component carrier and the virtual component carrier(s) may be non-orthogonal, in which case the UE may need to decode the respective data streams using non-orthogonal signal processing techniques.

In some embodiments, a physical component carrier and a virtual component carrier in the same component carrier group may be used to transmit data streams to a UE using a virtual carrier aggregation scheme. In such embodiments, the physical component carrier and the virtual component carrier may be assigned different carrier indices, while being associated with a common media access control (MAC) sublayer, a common radio link control (RLC) sublayer, and/or a common packet data convergence protocol (PDCP) sublayer. Assignments of carrier indices to physical/virtual component carriers may be a priori information of the UE, or otherwise communicated via higher layer signaling (e.g., RRC signaling, etc.). For example, the carrier index to the physical carrier can be zero and the carrier indices to the virtual carrier can be configured with a non-zero integer by the higher layer signaling. In other embodiments, a physical component carrier and a virtual component carrier, that are in different component carrier groups, may be used to transmit data streams to a UE using a virtual dual connectivity scheme. For example, a physical component carrier can be associated with a physical component carrier group and a virtual component carrier can be associated with a virtual component carrier group. In such embodiments, the physical component carrier and the virtual component carrier may be associated with different MAC sublayers, different RLC sublayers, and/or different PDCP sublayers.

Physical and virtual component carriers that are used to transmit data streams to a UE in accordance with embodiment virtual carrier aggregation and/or dual connectivity schemes may be associated with the same timing advance group (TAG), as well as have the same cyclic prefix (CP) durations, sub-carrier spacings, bandwidth partitions, and/or physical cell identifier (PCI). In some embodiments, frames communicated over physical and virtual component carriers that are being used for virtual carrier aggregation and/or dual connectivity may align in the time domain. In such embodiments, subframes in a frame communicated over the physical component carrier may be aligned in the time domain with subframes in a frame communicated over the virtual component carrier. The respective frames may carry the same number of subframes. Pairs of subframes, transmitted over the respective physical and virtual component carriers, that align in the time domain may be associated with the same subframe index.

Although frames communicated over respective physical and virtual component carriers may align in the time domain, individual channels within those frames may have different durations and/or different starting and ending symbol locations. By way of example, a physical downlink control channel (PDCCH) in a frame communicated over a physical component carrier may have a different duration than a PDCCH communicated over a corresponding virtual component carrier. When a channel communicated over a physical component carrier has a different duration than a corresponding channel communicated over a virtual component carrier, the last symbol (or ending symbol location) of the channel communicated over the physical component carrier may not align in the time domain with the last symbol (or ending symbol location) of the corresponding channel communicated over the physical component carrier. As an extension, subsequent channels in the respective physical and virtual component carriers may also have misaligned channel boundaries. For instance, if an ending symbol of a PDCCH communicated over a physical component carrier is misaligned with an ending symbol location of a PDCCH communicated over a corresponding virtual component carrier, then a starting and/or ending symbol location of a subsequent physical downlink shared channel (PDSCH) communicated over the physical component carrier may likewise be misaligned with a starting and/or ending symbol location of a PDSCH communicated over the corresponding virtual component carrier. These and other aspects are described in greater detail below.

In some embodiments, frames communicated over the physical component carrier and the frame communicated over the virtual component carrier share a common downlink synchronization channel (SCH). In such embodiments, one UE only receive the DL SCH associated with the physical component carrier. In some embodiments frame communicated over the physical component carrier and the frame communicated over the virtual component carrier share a common physical broadcast channel (PBCH). In such embodiments, a UE only receives the DL PBCH associated with the physical component carrier. In some embodiments, the frame communicated over the physical component carrier and the frame communicated over the virtual component carrier share a common search space in a physical downlink control channel (PDCCH). In such embodiments, a UE only monitors the common search space associated with the physical component carrier. In some embodiments, the frame communicated over the physical component carrier and the frame communicated over the virtual component carrier share a common downlink control information (e.g., for the time unit structure) without blind detection. In such embodiments, a UE only monitors the common downlink control information associated with the physical component carrier wherein time unit can be slot and/or mini-slot and/or subframe.

FIG. 1 illustrates a network 100 for communicating data. The network 100 comprises a transmit/receive point (TRP) no having a coverage area 101, a plurality of mobile devices 103, and a backhaul network 104. As shown, the TRP no establishes uplink (dashed line) and/or downlink (dotted line) connections with the user equipments (UEs) 101, which serve to carry data from the UEs to the TRP no and vice-versa. Data carried over the uplink/downlink connections may include data communicated between the UEs 103, as well as data communicated to/from a remote-end (not shown) by way of the backhaul network 104. As used herein, the term "TRP" refers to any component (or collection of components) configured to provide wireless access to a network, such as a base station, an evolved NodeB (eNodeB or eNB) or a gNB, a macro-cell, a femtocell, a Wi-Fi access point (AP), or other wirelessly enabled devices. TRPs may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
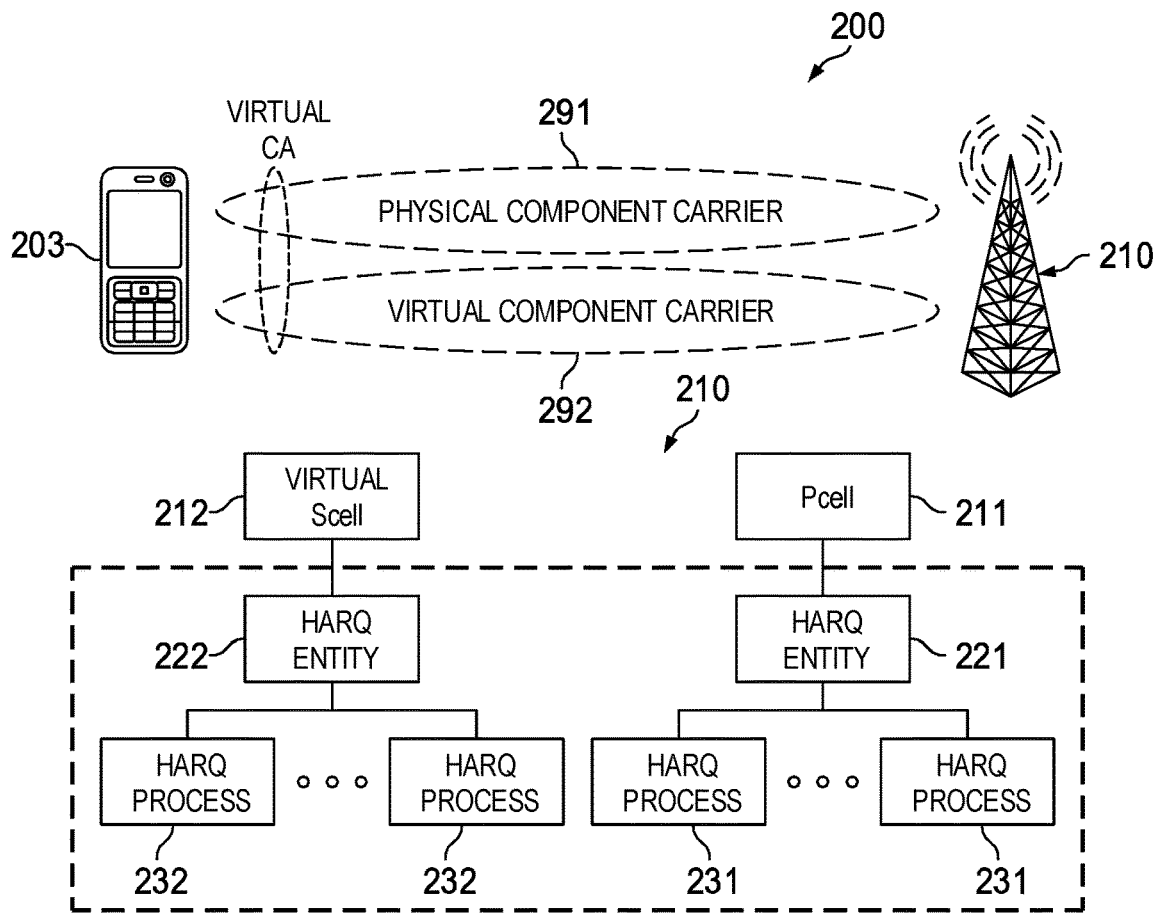
FIG. 2 is a diagram of a virtual carrier aggregation transmission scheme.

Aspects of this disclosure provide embodiment virtual carrier aggregation techniques. FIG. 2 is a diagram of a virtual carrier aggregation transmission scheme 200. As shown, a TRP 210 transmits data streams to a UE 203 over a physical component carrier 291 and a virtual component carrier 292 that belong to the same component carrier group. In this example, the TRP 210 includes a primary cell (PCell) 211 that transmits a data stream over the physical component carrier 291 and a virtual secondary cell (Virtual SCell) 212 that transmits a data stream over the virtual component carrier 292. A Hybrid Automatic Repeat reQuest (HARQ) entity 221 determines whether codewords (CW) and/or code blocks (CB) and/or code block groups (CBG) transmitted over the physical component carrier 291 were successfully decoded by the UE 203, and the HARQ entity 222 determines whether codewords and/or code blocks and/or code block groups transmitted over the virtual component carrier 292 were successfully decoded by the UE 203. At least one codeword transmitted over the physical component carrier 291 may be associated with a corresponding one of the HARQ processes 231, and at least one codeword transmitted over the virtual component carrier 292 may be associated with a corresponding one of the HARQ processes 232.

Figure 3:
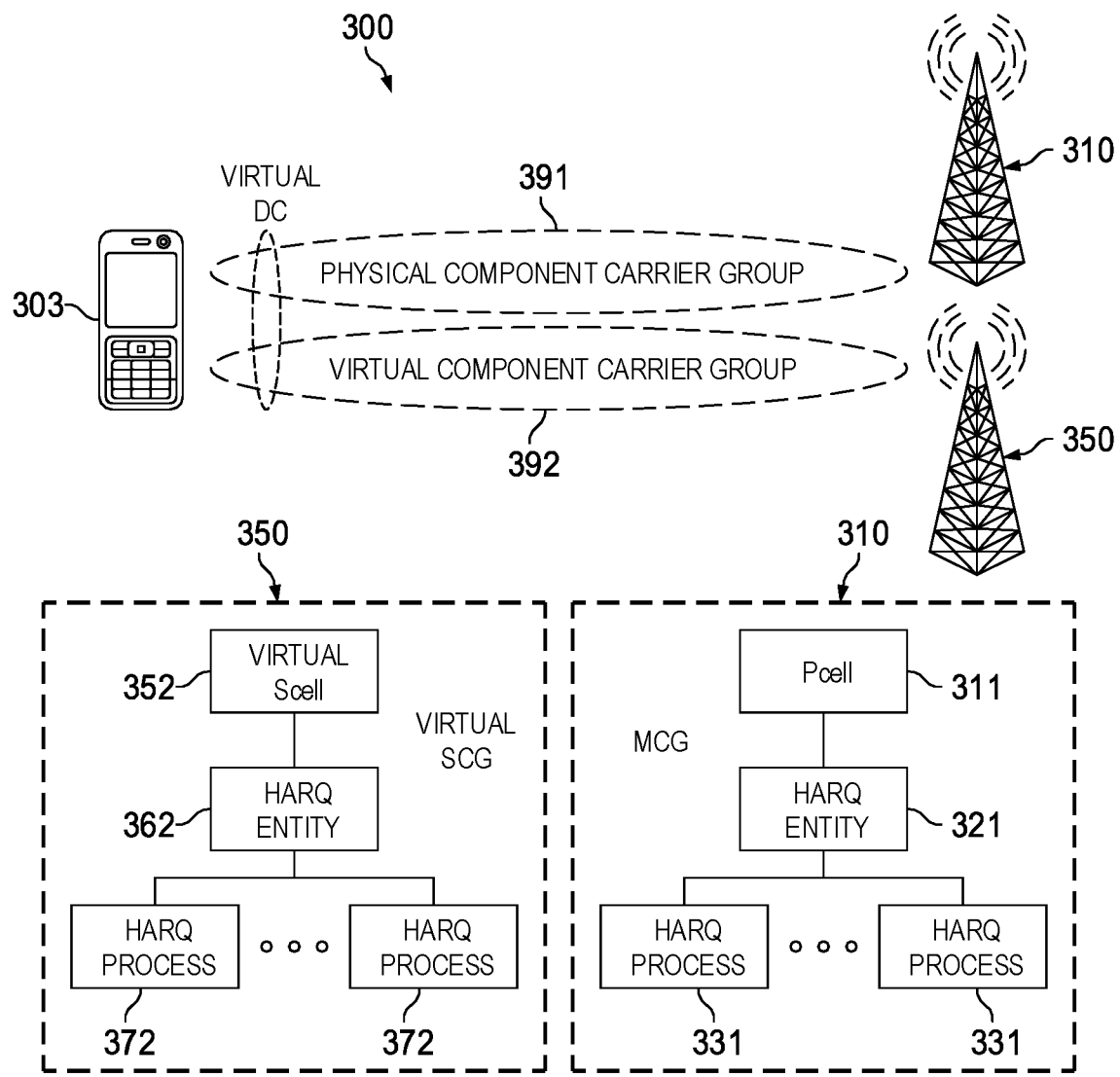
FIG. 3 is a diagram of a virtual dual connectivity transmission scheme.

Aspects of this disclosure also provide embodiment virtual dual connectivity techniques. FIG. 3 is a diagram of a virtual dual connectivity transmission scheme 300. As shown, a TRP 310 transmits a data stream to a UE 303 over a physical component carrier 391, and a TRP 310 transmits a data stream to the UE 303 over a virtual component carrier 392, which belongs to a different component carrier group than the physical component carrier 391. For example, a physical component carrier may belong to a physical component carrier group and a virtual component carrier may belong to a virtual component carrier group. In this example, the TRP 310 includes a primary cell (PCell) 311 that transmits data over the physical component carrier 391, and a HARQ entity 321 determines whether codewords and/or code blocks and/or code block groups transmitted over the over the physical component carrier 391 were successfully decoded by the UE 303. Similarly, the TRP 350 includes a virtual secondary cell (virtual SCell) 352 that transmits data over the virtual component carrier 392, and a HARQ entity 362 that determines whether codewords and/or code blocks and/or code block groups transmitted over the over the virtual component carrier 392 were successfully decoded by the UE 303. At least one codeword transmitted over the physical component carrier 391 may be associated with a corresponding one of the HARQ processes 331, and at least one codeword transmitted over the physical component carrier 392 may be associated with a corresponding one of the HARQ processes 372.

The TRP 310 and the TRP 350 may be connected by a backhaul connection that is incapable of providing sufficient ideal coordination for conventional, or virtual, carrier aggregation. For example, a latency associated with signaling communicated over the backhaul may be such that the backhaul is not capable of supporting a common MAC, RLC, and/or PDCP sublayer for data transmissions by the respective TRPs 310, 350.

Figure 4:
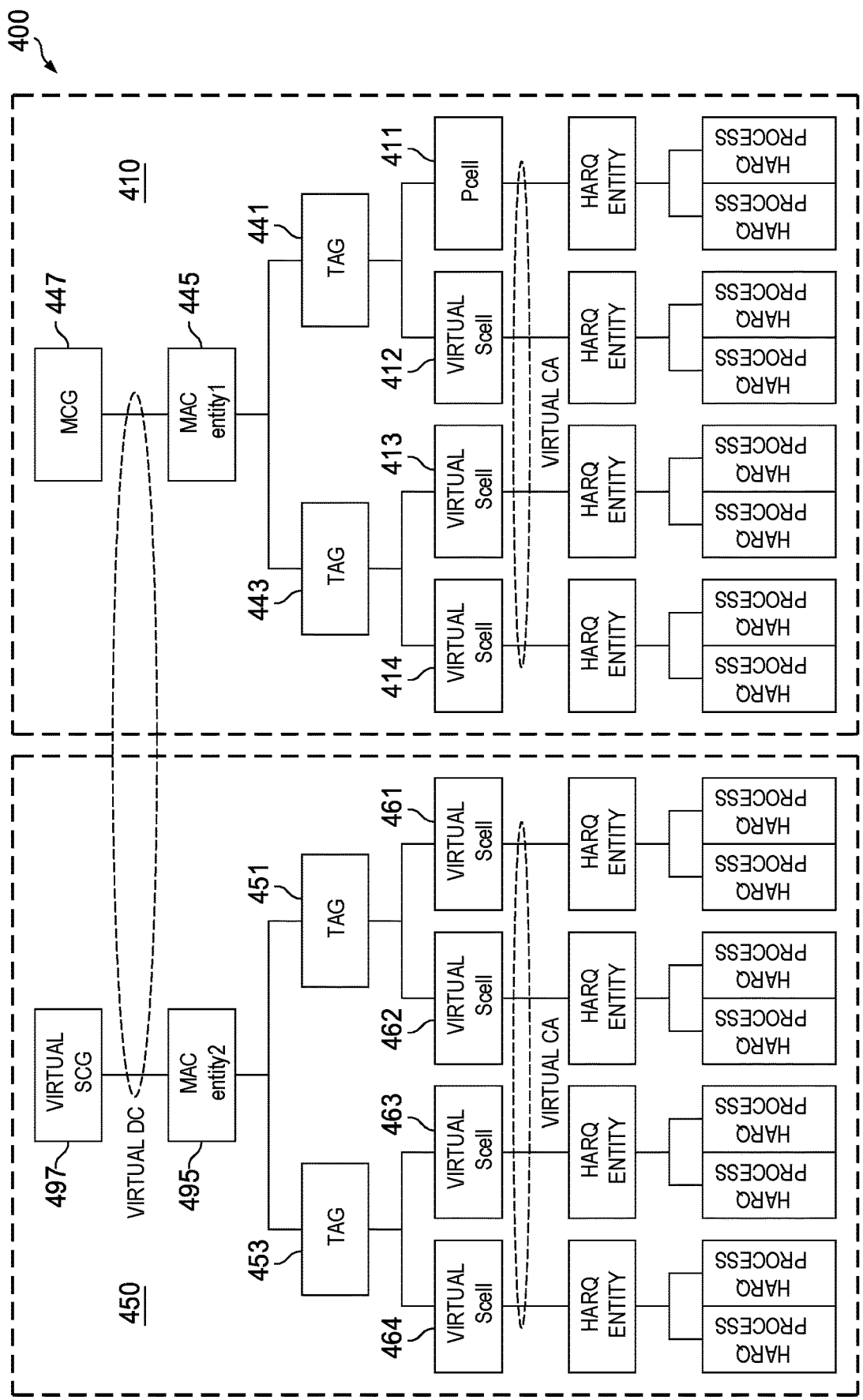
FIG. 4 is a diagram of a virtual carrier aggregation and dual connectivity transmission scheme.

In some instances, virtual carrier aggregation and virtual dual connectivity schemes may be combined to provide additional simultaneous data channel assignment (e.g., HARQ process assignment) to a UE. FIG. 4 is a diagram of a virtual carrier aggregation and dual connectivity transmission scheme 400. Collectively speaking, the TRPs, 410, 450 collectively transmit data streams over respective groups of component carriers according to a virtual dual connectivity scheme. Individually speaking, the TRP 410 transmits data streams to a UE (not shown) over component carriers using a primary cell 411 and virtual secondary cells 412, 413, 414 according to a virtual component carrier configuration, and the TRP 450 transmits data streams to the UE over component carriers using a virtual primary cell 461 and/or virtual secondary cells 462, 463, 464 according to a separate virtual component carrier scheme configuration.

In particular, the TRP 410 transmits data streams over a physical component carrier using a primary cell 411, and over virtual component carriers using virtual secondary cells 412, 413, 414, and primary cell 411 and virtual secondary cells 412, 413, 414 belong to one master cell group (MCG). Likewise, the TRP 450 transmits data streams over a virtual component carrier using a virtual primary cell 461, and/or over virtual component carriers using virtual secondary cells 462, 463, 464, and virtual primary cell 461 and virtual secondary cells 462, 463, 464 belong to one virtual secondary cell group (virtual SCG).

Primary cell 411, virtual secondary cells 412, 413, 414, virtual primary cell 461, and virtual secondary cells 462, 463, 464 share one common time advance group (TAG).

In one embodiment, the physical component carrier associated with the primary cell 411 and the virtual component carrier associated with the virtual secondary cell 412, 413, 414 belong to a physical component carrier group. The virtual component carrier associated with the virtual primary cell 461 and the virtual component carriers associated with the virtual secondary cell 462, 463, 464 belong to a separate virtual component carrier group. As used herein, the term "physical component carrier group" refers to a group of component carriers that includes at least one physical component carrier, and the term "virtual component carrier group" refers to a group of component carriers that consists of virtual component carriers.

In this example, the component carriers associated with the primary cell 411 and the virtual secondary cells 412, 413, 414 belong to an MCG 447 and the component carriers associated with the virtual primary cell 461 and the virtual secondary cells 462, 463, 464 belong to a virtual SCG 497. Component carriers associated with MCG 447 may be associated with a common MAC entity 445, and component carriers associated with virtual SCG 497 may be associated with a common MAC entity 495. In some embodiments, the UE that receives the data streams according to the virtual dual connectivity scheme may be associated with different cell specific identifiers (e.g., different cell specific radio network temporary identifiers (C-RNTIs)) for different component carrier groups 447, 497. For example, one C-RNTI can be configured during a random access procedure and the other C-RNTI can be configured with RRC signaling. Alternatively, the UE may be assigned the same cell specific identifier (e.g., same C-RNTI) in the coverage areas, or RANs, associated with the respective component carrier groups 447, 497.

Figure 5:
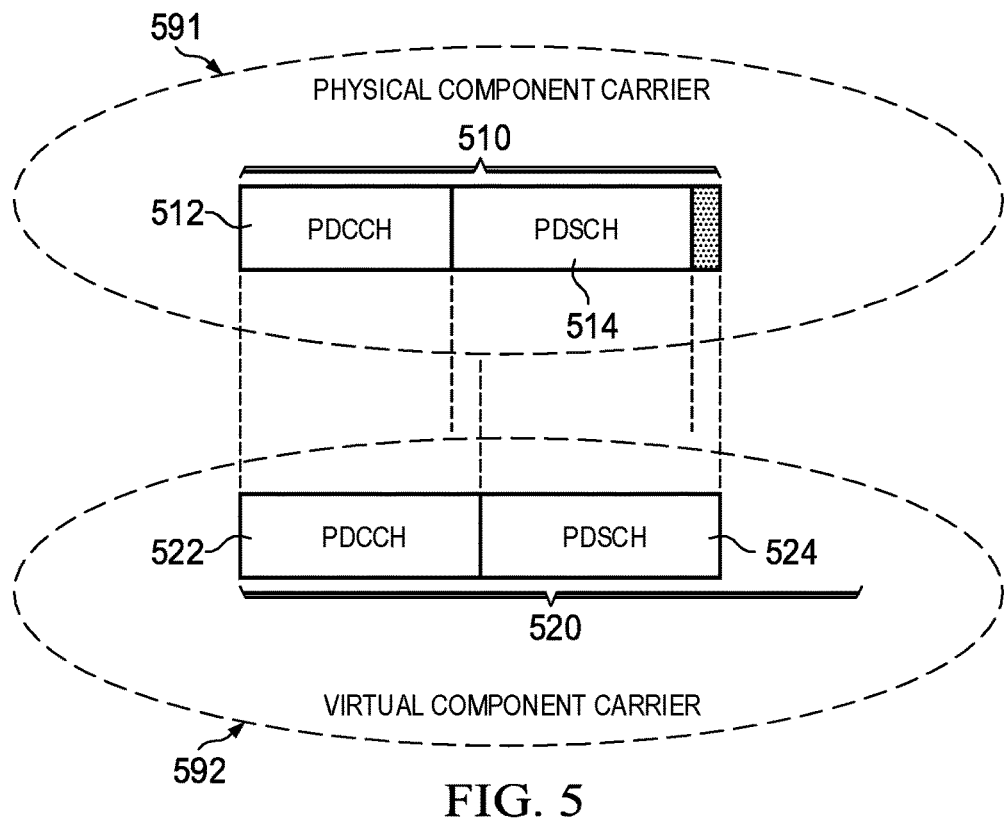
FIG. 5 is a diagram of frames communicated over physical and virtual component carriers according to a virtual carrier aggregation or dual connectivity transmission scheme.

In some embodiments, frames communicated over physical and virtual component carriers align in the time domain. One or more channels carried in the frame have different durations such that a starting or ending symbol of a channel communicated over the physical component carrier is not aligned in the time domain with a corresponding channel communicated over the virtual component carrier. FIG. 5 is a diagram of frames 510, 520 communicated over a physical component carrier 591 and a virtual component carrier 592 (respectively). In this example, a PDCCH 512 in the frame 510 communicated over the physical component carrier 591 has a shorter duration than a PDCCH 522 in the frame 520 communicated over the virtual component carrier 592. As a result, an ending symbol location of the PDCCH 512 is not aligned in the time domain with an ending symbol location of the ending symbol location of the PDCCH 522. This may also affect the alignment of subsequent channels in the respective frames 510, 520. In this example, the starting and/or ending symbol locations of the PDSCH 514 in the frame 510 communicated over the physical component carrier 591 are not aligned in the time domain with the corresponding starting and/or ending symbol locations of the PDSCH 524 in the frame 520 communicated over the physical component carrier 592. A guard interval may be added to the frame 510 so that the end of the frame 510 aligns with the end of the frame 520. In such embodiments, a starting or ending symbol location for at least one of a physical downlink control channel (PDCCH), a physical downlink shared channel (PDSCH) in the frame communicated over the physical component carrier can be detected by one common downlink control information without blind detection. A starting or ending symbol location for at least one of a physical downlink control channel (PDCCH), a physical downlink shared channel (PDSCH) in the frame communicated over the virtual component carrier can be configured by high layer RRC signaling.

Figure 6:
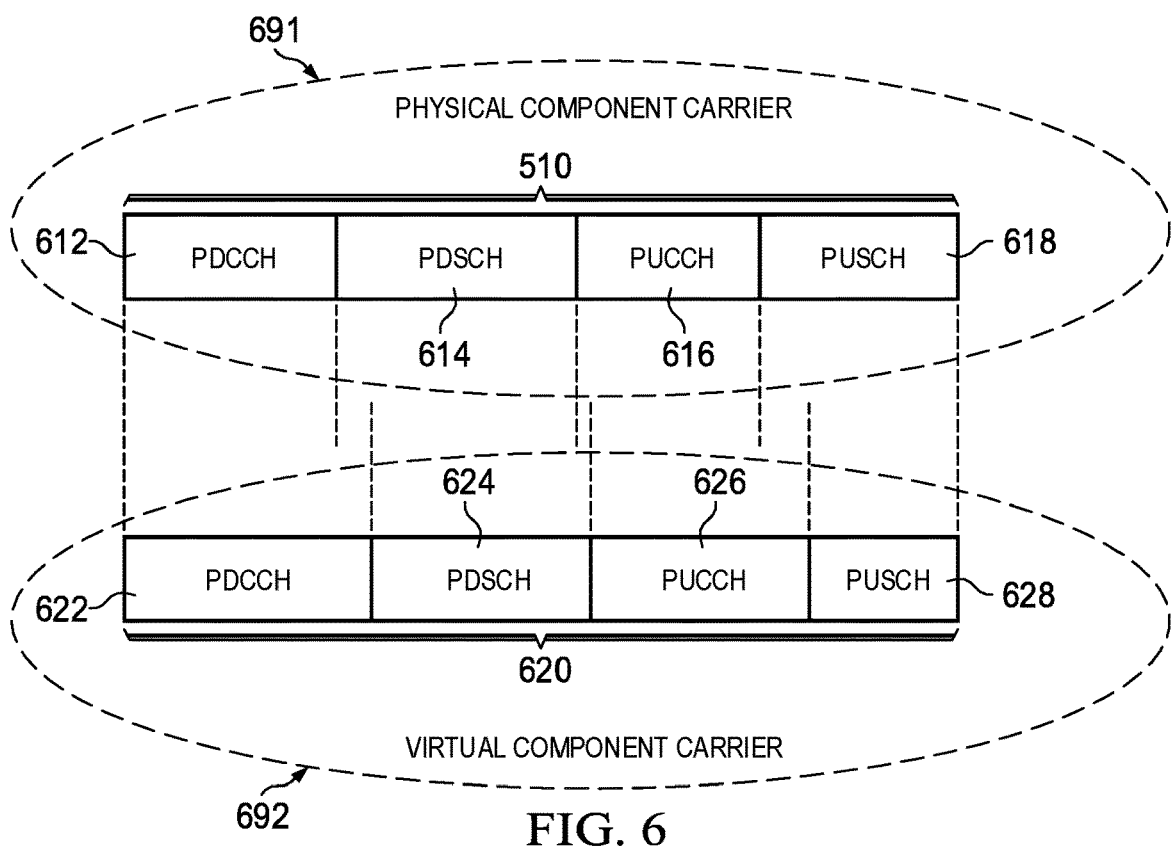
FIG. 6 is another diagram of frames communicated over physical and virtual component carriers according to a virtual carrier aggregation or dual connectivity transmission scheme.

FIG. 6 is a diagram of frames 610, 620 communicated over a physical component carrier 691 and a virtual component carrier 692 (respectively). Like FIG. 5, a PDCCH 612 in the frame 610 communicated over the physical component carrier 691 has a shorter duration than a PDCCH 622 in the frame 620 communicated over the virtual component carrier 692. Additionally, in FIG. 6, each of the PDSCH 614, the PUCCH 616, and the PUSCH 618 in the frame 610 communicated over the physical component carrier 691 have different durations than a corresponding one of the PDSCH 624, the PUCCH 626, and the PUSCH 628 in the frame 620 communicated over the virtual component carrier 692. Additionally, as a result of the different channel durations, ending symbol locations of the PDCCH 612, the PDSCH 614, and the PUCCH 616 are not aligned in the time domain with ending symbol locations of the PDCCH 622, PDSCH 624, and PUCCH 626 (respectively), and starting symbol locations of the PDSCH 614, the PUCCH 616, and the PUSCH 618 are not aligned in the time domain with ending symbol locations of the PDSCH 624, PUCCH 626, and PUSCH 628 (respectively). In such embodiments, a starting or ending symbol location for at least one of a physical downlink control channel (PDCCH), a physical downlink shared channel (PDSCH), a physical uplink shared channel (PUSCH) and a physical uplink control channel (PUCCH) in the frame communicated over the physical component carrier can be detected by one common downlink control information without blind detection. A starting or ending symbol location for at least one of a physical downlink control channel (PDCCH), a physical downlink shared channel (PDSCH), a physical uplink shared channel (PUSCH) and a physical uplink control channel (PUCCH) in the frame communicated over the virtual component carrier can be configured by high layer RRC signaling. Although FIG. 6 depicts an example in which each of the PDCCHs 612, 622, PDSCHs 614, 624, PUCCHs 616, 626, and PUSCHs 618, 628 have different durations, it should be appreciated other examples are also possible. By way of example, PDCCHs communicated over physical and virtual component carriers may have the same duration, and the PDSCHs, PUCCHs, and/or PUSCHs may have different durations. In some examples, one or more channels are excluded from the frame communicated over a virtual component carrier. By way of example, a virtual component carrier may only carry a PDCCH and PDSCH, in which case the duration of the PDSCH may be extended to provide more downlink channel bandwidth.

In such embodiments, a starting or ending symbol location for at least one of a physical downlink control channel (PDCCH), a physical downlink shared channel (PDSCH), a physical uplink shared channel (PUSCH) and a physical uplink control channel (PUCCH) in the frame communicated over both the physical component carrier and the physical component carrier can be the same, and can be detected by one common downlink control information without blind detection if there is no specific configuration for a starting or ending symbol location for at least one of a physical downlink control channel (PDCCH), a physical downlink shared channel (PDSCH), a physical uplink shared channel (PUSCH) and a physical uplink control channel (PUCCH) in the frame communicated over the virtual component carrier.

Figure 7:
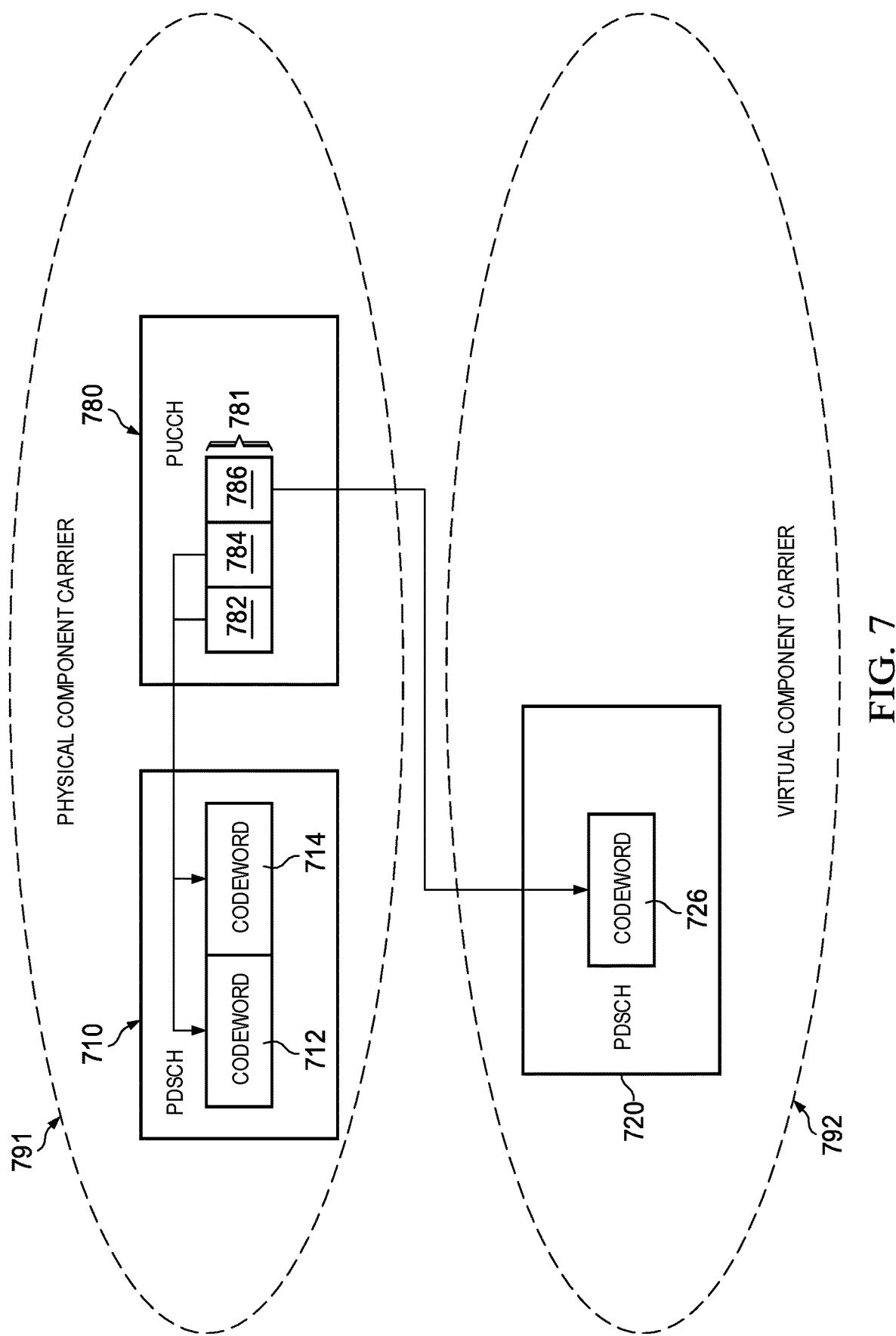
FIG. 7 is a diagram of a PUCCH message carrying HARQ bits corresponding to codewords in frames communicated over physical and virtual component carriers according to a virtual carrier aggregation or dual connectivity transmission scheme.

In some embodiments, a single PUCCH message may carry HARQ indication bits for codewords and/or code blocks and/or code block groups in frames communicated over both physical and virtual component carriers. FIG. 7 is a diagram of PUCCH message 780 carrying HARQ bits 782, 784, 786 that correspond to codewords communicated over physical and virtual component carriers. In particular, the HARQ bits 782, 784 indicate whether codewords 712, 714 (respectively) in a PDSCH 710 communicated over a physical component carrier 791 were successfully decoded by a UE. The HARQ bit 786 indicates whether a codewords 726 in a PDSCH 720 communicated over a virtual component carrier 792 were successfully decoded by the UE.

Figure 8A:
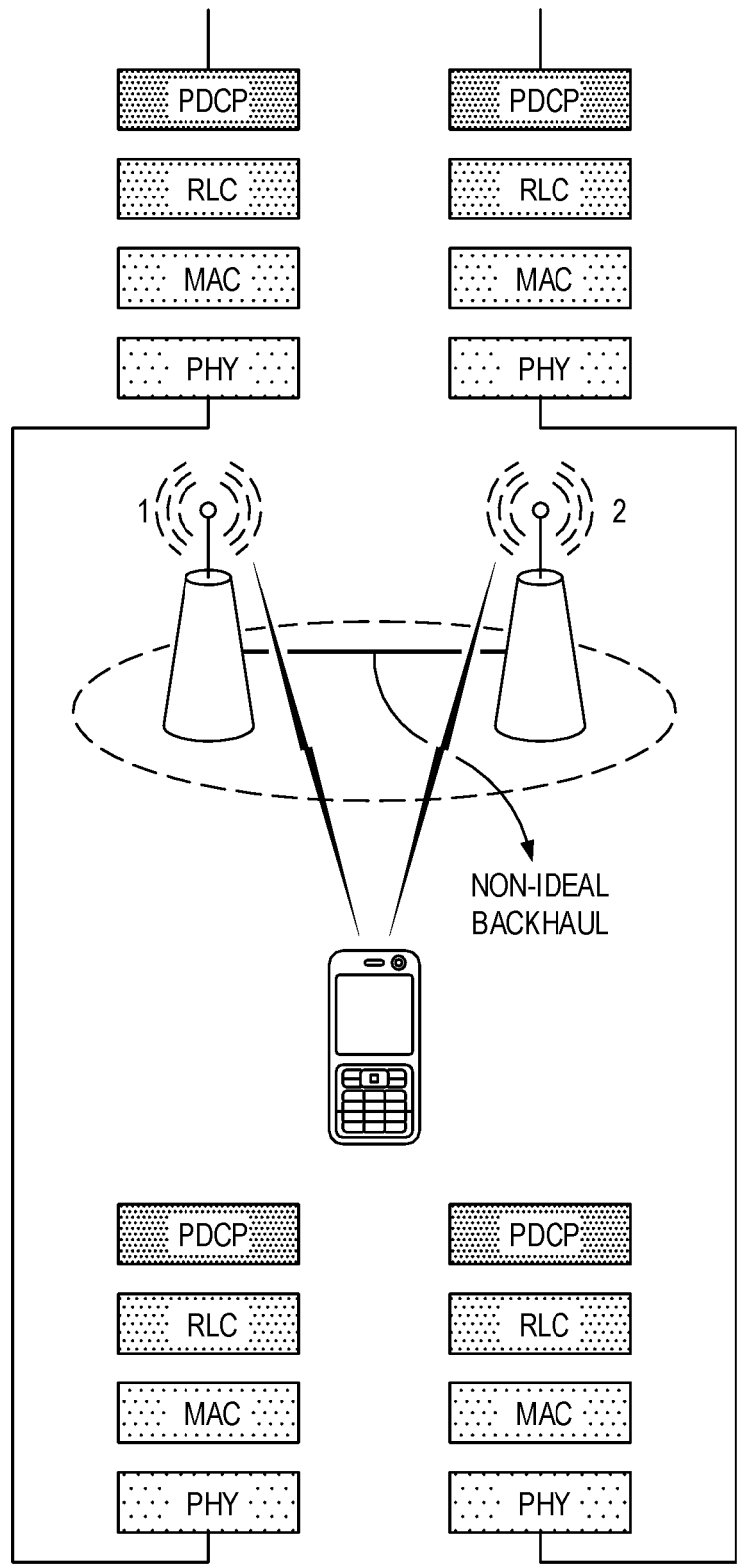
FIGS. 8A-8E are diagrams of embodiment virtual dual carrier channel configurations.

In embodiment virtual dual connectivity schemes, virtual and physical component carriers may have different high layer association configurations. FIGS. 8A-8F are diagrams of different virtual dual carrier high layer association configurations. In particular, FIG. 8A depicts a virtual dual carrier high layer association configuration in which different component carrier groups have separate MAC, RLC, and PDCP sublayers on the network-side and UE-side of the wireless links.

Figure 8B:
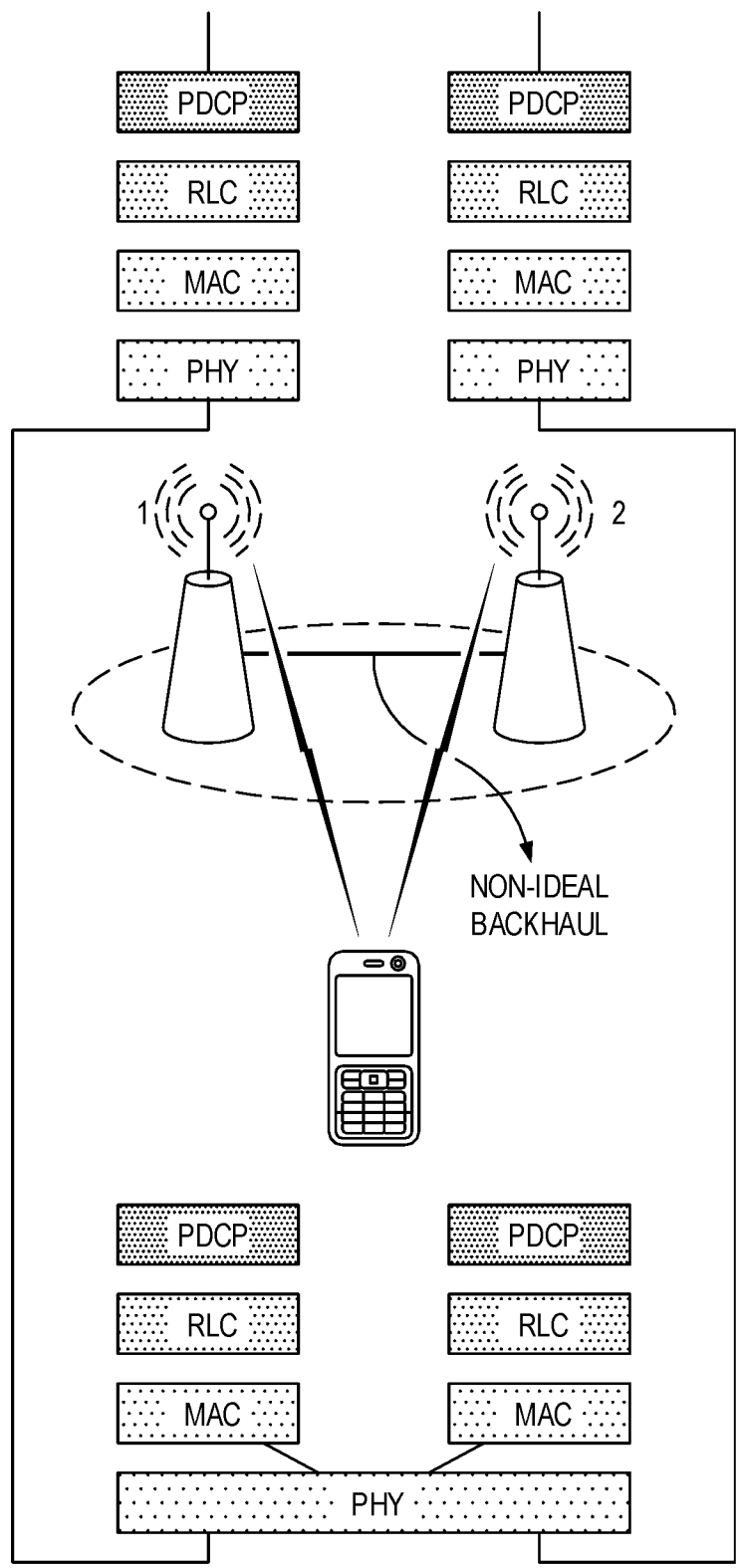

FIG. 8B depicts a virtual dual carrier high layer association configuration in which different component carrier groups have a common physical sublayer on the UE-side of the wireless links, but have separate MAC, RLC, and PDCP sublayers on the network-side of the wireless links.

Figure 8C:
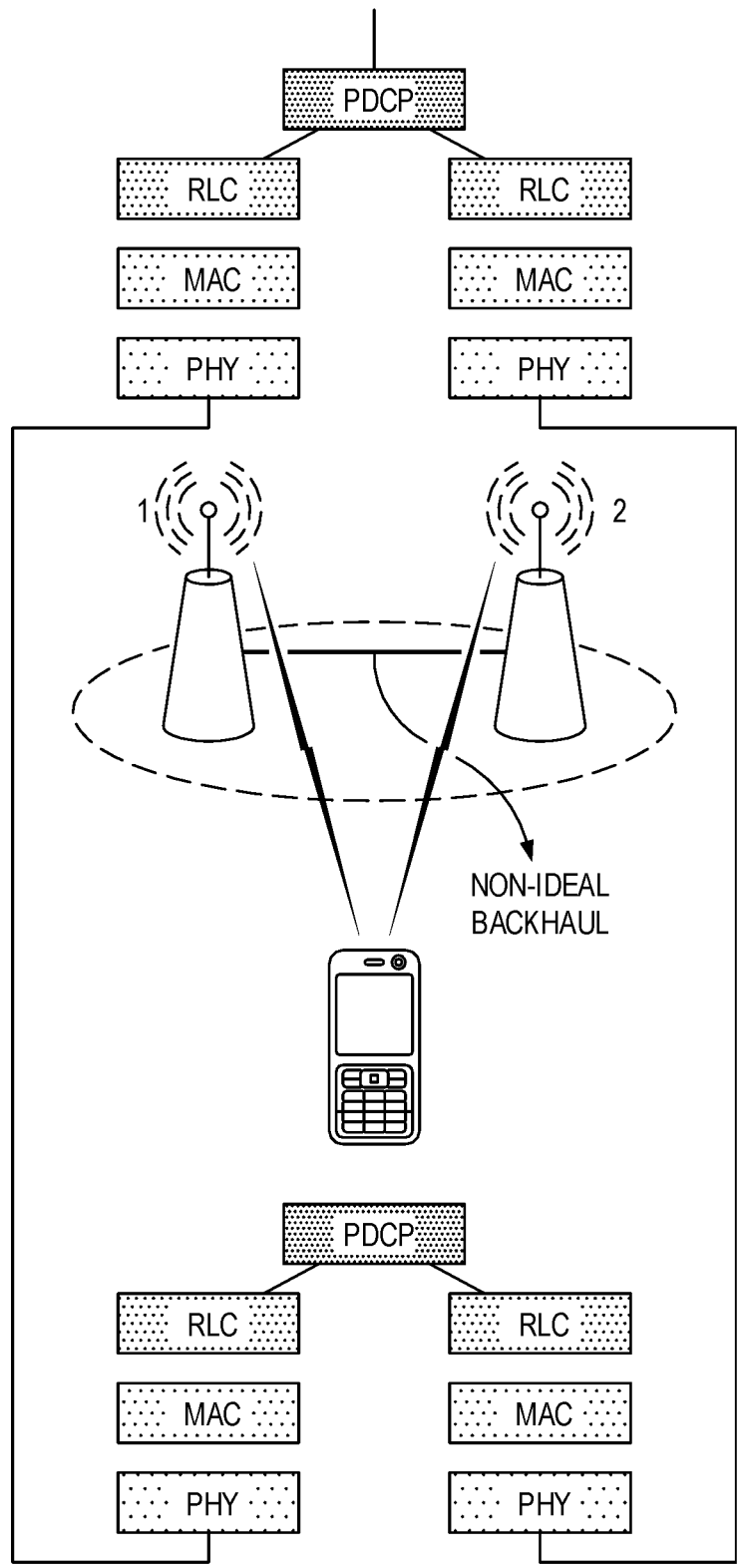

FIG. 8C depicts a virtual dual carrier high layer association configuration in which different component carrier groups have a common PDPC sublayer on both the UE-side and network-side of the wireless links, but have separate MAC and RLC sublayers on the network-side of the wireless links.

Figure 8D:
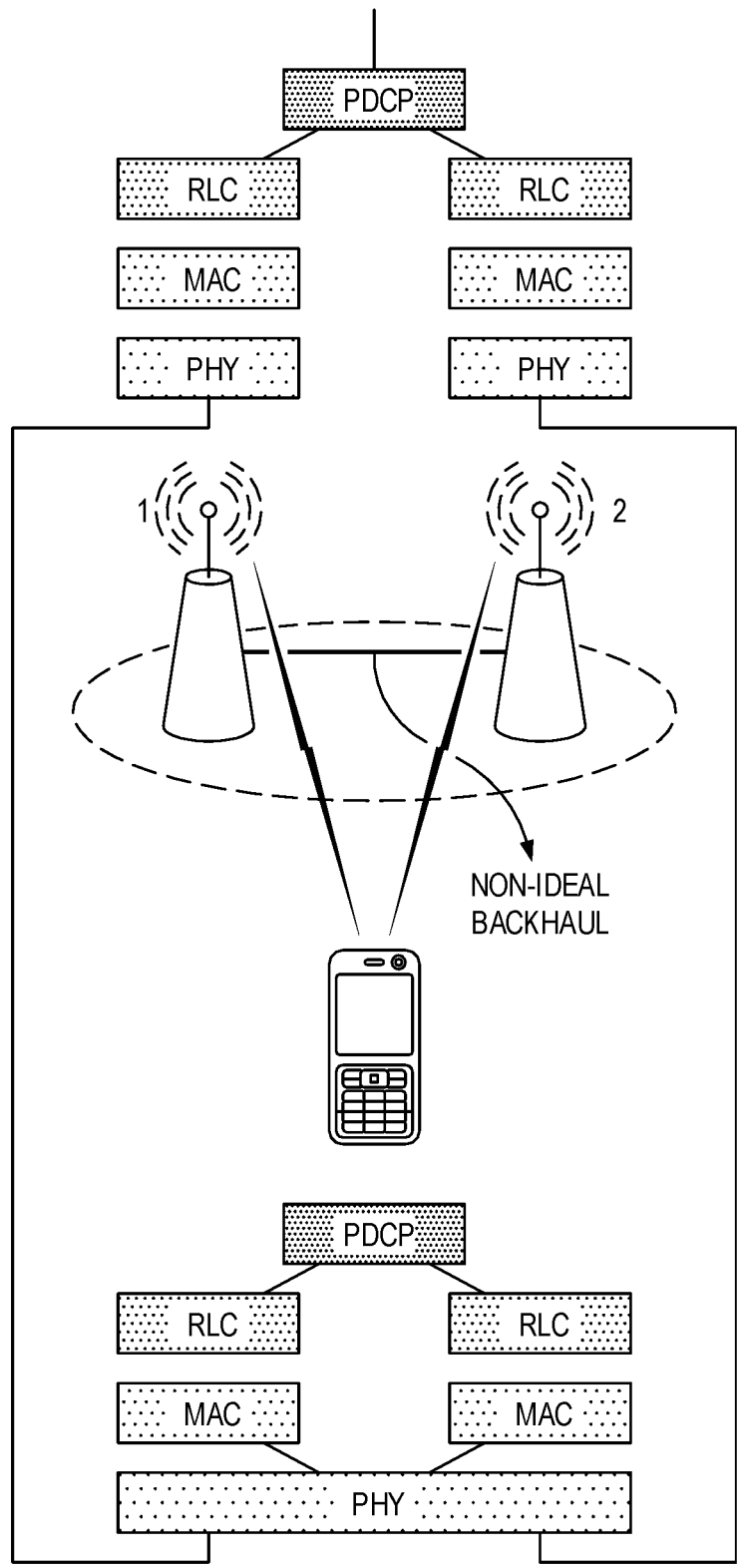

FIG. 8D depicts a virtual dual carrier high layer association configuration in which different component carrier groups have a common PDPC sublayer on both the UE-side and the network-side of the wireless links, and separate MAC and RLC sublayers on both the UE-side and the network-side of the wireless links.

Figure 8E:
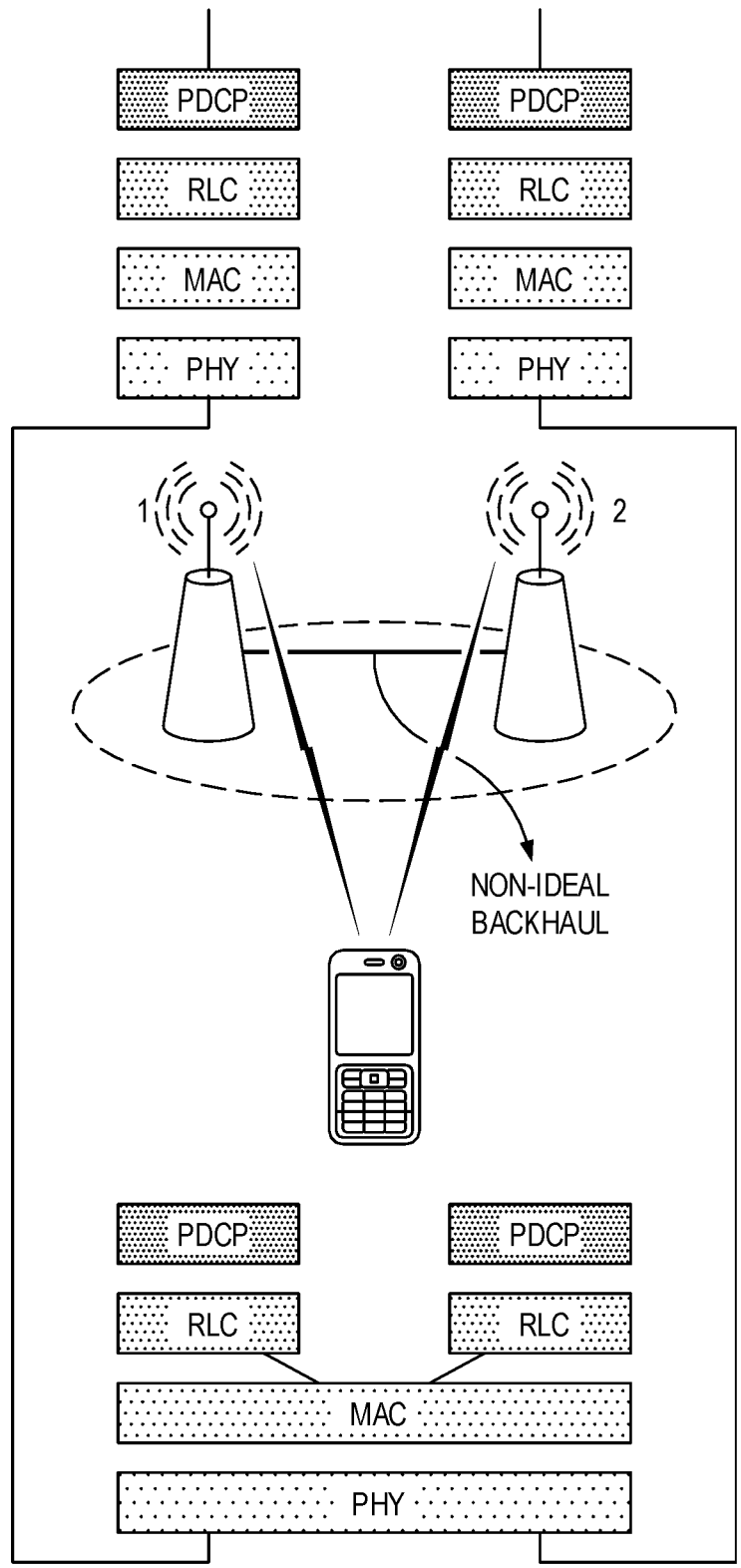

FIG. 8E depicts a virtual dual carrier high layer association configuration in which different component carrier groups have a common MAC sublayer on the UE-side of the wireless links, separate PDCP and RLC sublayers on the UE-side of the wireless links, and separate MAC, RLC, and PDCP sublayers on the network-side of the wireless links.

Figure 8F:
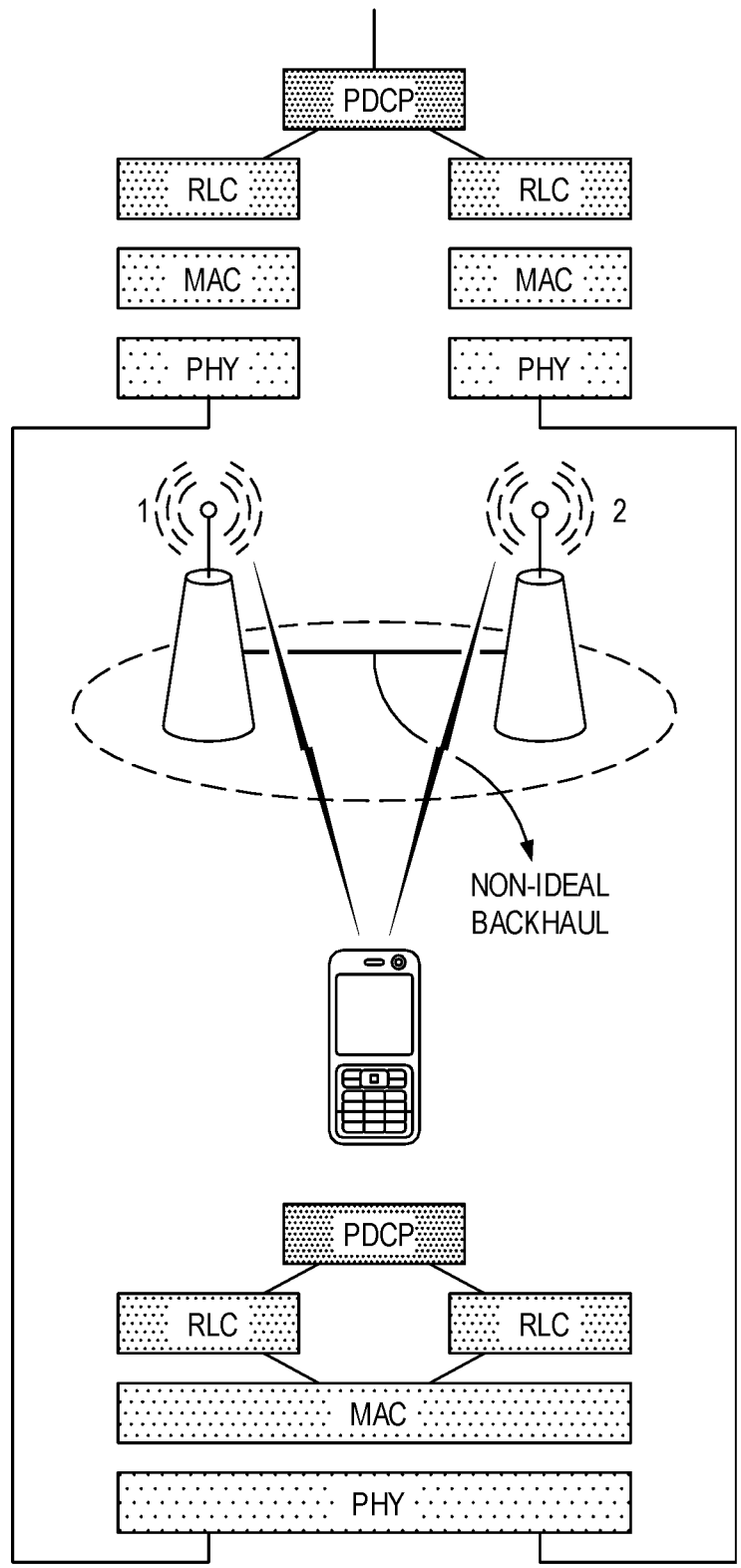

FIG. 8F depicts a virtual dual carrier high layer association configuration in which different component carrier groups have a common MAC sublayer, a common PDCP sublayer, and separate RLC sublayers on the UE-side of the wireless links, and a common PDCP sublayer, as well as MAC, and RLC, sublayers, on the network-side of the wireless links.

Figure 9:
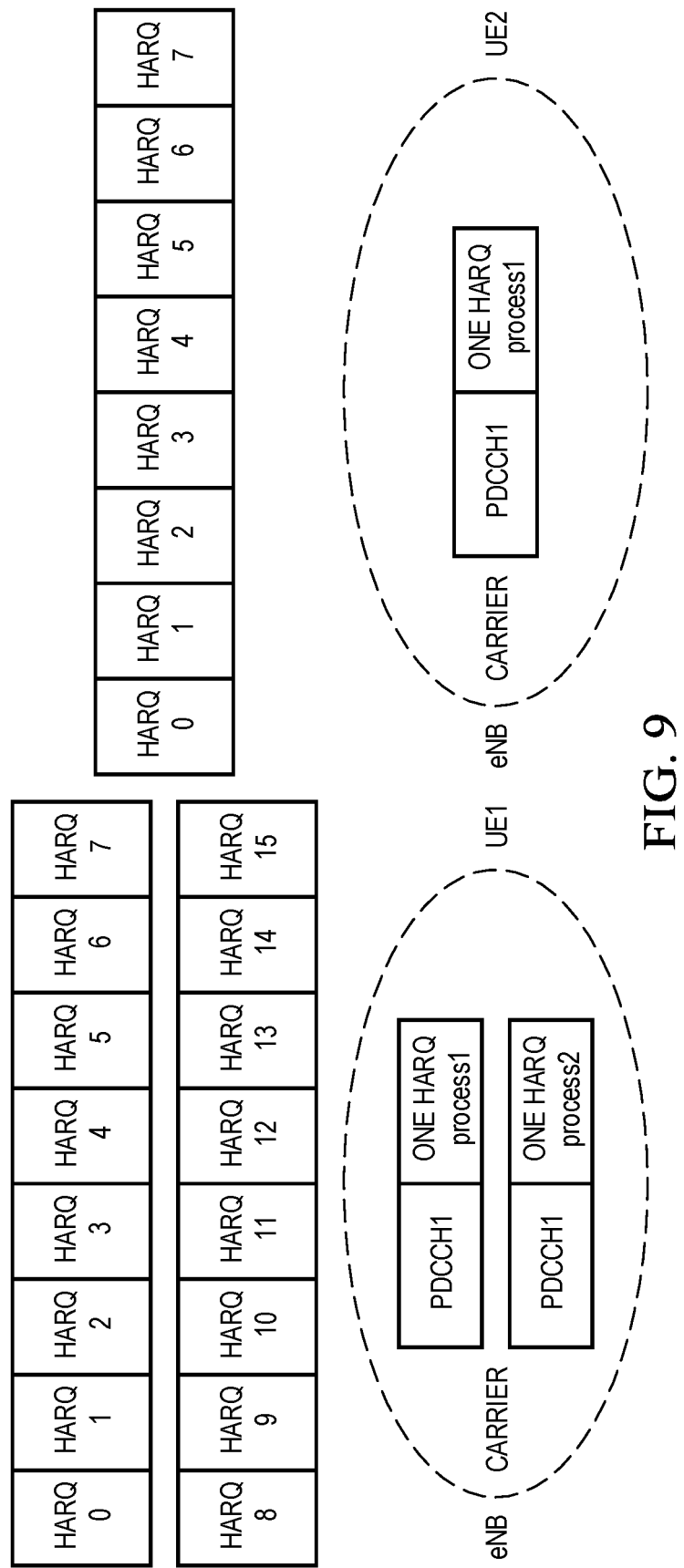
FIG. 9 is a diagram of component carrier associated with different maximum numbers of HARQ processes for different UEs.

In some embodiments, for one physical component carrier or one virtual component carrier, more than one HARQ processes can be simultaneously assigned by multiple assignments (e.g. PDCCH) for one unicast channel (e.g. PUSCH or PDSCH) within one time unit which can be one of slot, mini-slot and subframe. In such embodiments, for one physical component carrier or one virtual component carrier, the maximum HARQ process number associated with multiple HARQ process assignments is different from the maximum HARQ process number associated with one HARQ process assignment. FIG. 9 depicts a component carrier associated with a maximum of 16 HARQ processes for a first UE (UE1), and another component carrier associated with a maximum of 8 HARQ processes for a second UE (UE2). In this example, UE1 is configured to receive two HARQ processes for unicast PDSCH or PUSCH via two assignments (PDCCH1 and PDCCH2) and UE2 is configured to receive one HARQ processes for unicast PDSCH or PUSCH via one assignment (PDCCH1). For each UE, the maximum HARQ process number associated with one component carrier can be configured via explicit control signaling or derived from the UE-specific information via N×M, e.g., a number N of HARQ process assignments (e.g., received over one or multiple PDCCH channel) for unicast PDSCH or PUSCH within one time unit and initial maximum HARQ process number M. M can be predefined or configured with broadcasting channel for one component carrier, and N can be UE-specifically configured with high layer RRC signaling.

In some embodiments, one PUCCH resource will be used to transmit a combined HARQ feedback message, which may include HARQ bits associated with each codeword, code block, and/or code block group received over component carriers in a component carrier group or in a set of component carrier groups associated with a given UE. In such embodiments, the total number of HARQ feedback may be determined by at least one of the number of component carrier numbers, the semi-static configured number of codewords and/or code blocks and/or code block groups. One HARQ bit is associated with one codeword, or one code block, or one code block group. For the example of HARQ feedback, each component carrier (associated with each PDCCH and each TRP) will independently and dynamically schedule the CW number according to the traffic buffer. For the first time, PDCCH1 schedules one CW and PDCCH2 schedules one CW, the at least 2 bit should be feedback to network side. For the second time, PDCCH1 schedules one CW and PDCCH2 has no scheduling, then at least 1 bit should be feedback to network side.

Figure 10:
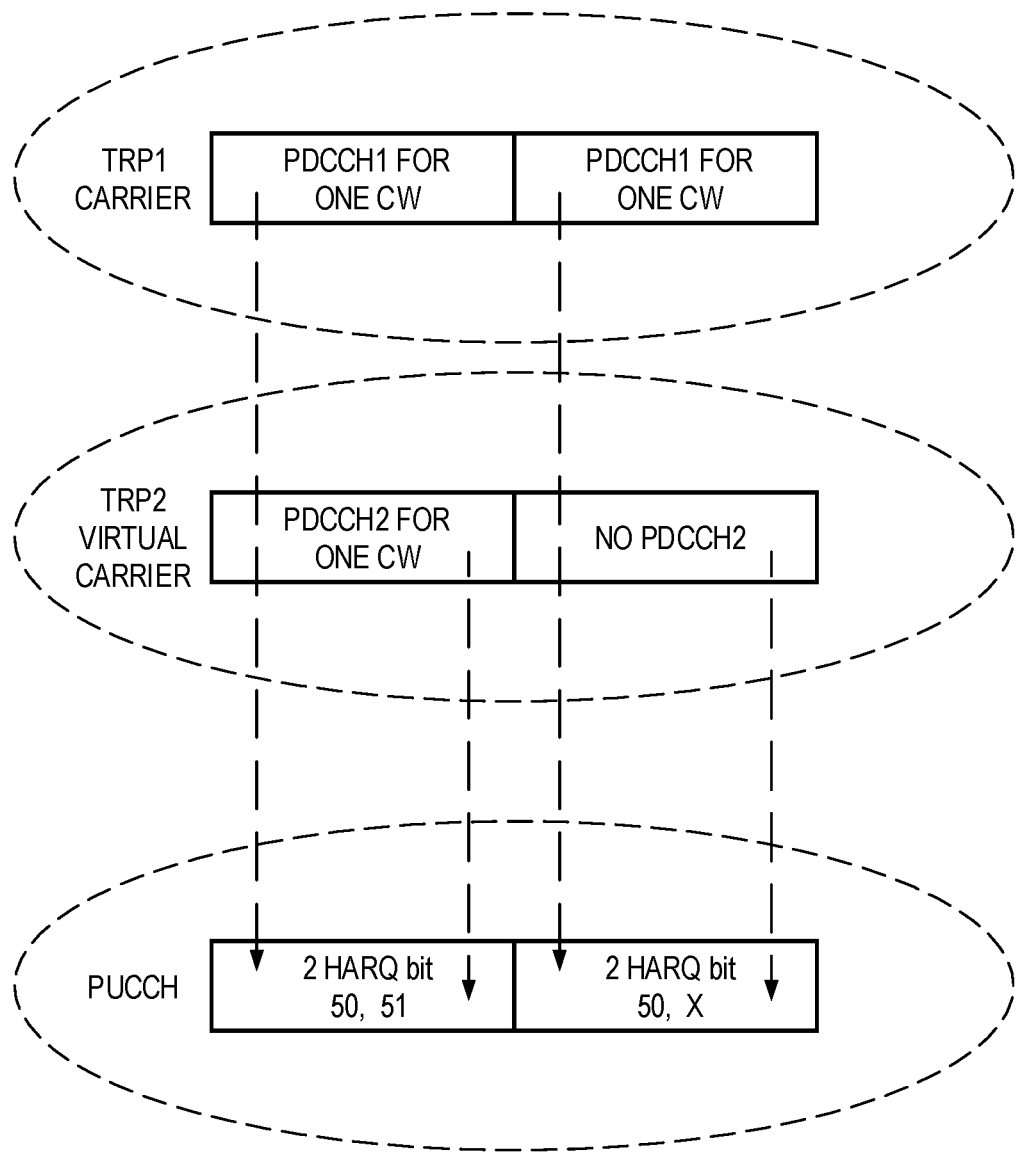
FIG. 10 is a diagram of a mapping between HARQ bits in a PUCCH message and physical downlink control channels communicated over different component carriers.

However, this combined HARQ feedback should be known to TRPs without ideal coordination. This means TRP1 (physical carrier) doesn't know how many CW will be scheduled by TRP2 (virtual carrier). If the combined HARQ feedback bit number is based on the dynamic detection, both TRP1 and TRP2 don't know the exact the dynamic feedback bit number and will fail the detection. So they should make a long-term or semi-static coordination for the feedback number for each carrier. Even during each scheduling, scheduling number of CW can be different, however feedback number should be definite. Then the high layer signaling should indicate the semi-static CW number and/or CB number and/or CBG number. Then the total feedback number can be determined based on the component number and associated semi-static CW/CB/CBG number. Note that, the dynamic scheduling of CW/CB/CBG will not be larger than the semi-static number. FIG. 10 is a diagram of a mapping between HARQ bits in a PUCCH message and physical downlink control channels communicated over different component carriers.

In some embodiments, for transmitting one combined HARQ feedback associated with both physical component carrier and virtual physical component carrier which can be from same and different component carrier group, one PUCCH resource can be semi-statically configured to the UE.

In some embodiments, the combined HARQ feedback should be based over the specific ordering and mapping rules for all HARQ feedback bits.

For all HARQ feedback bits corresponding to different component carrier groups, HARQ feedback bits corresponding to physical component carrier group or component carrier group associated with lower group indices precede HARQ feedback bits corresponding to virtual component carrier groups or component carrier groups associated with higher group indices, the physical component carrier group including at least one physical component carrier, and the virtual component carrier group consisting of virtual component carriers; For HARQ feedback bits corresponding to one component carrier group, HARQ feedback bits corresponding to component carrier associated with lower carrier indices precede HARQ feedback bits corresponding to component carriers associated with higher carrier indices in the given component carrier group; and/or HARQ feedback bits corresponding physical component carrier precede HARQ feedback bits corresponding to virtual component carriers in the given component carrier group. Table 1 includes rules for HARQ feedback bit concatenation in virtual dual connectivity schemes with indices for different component carrier groups, component carrier, codewords, and codeblocks.

TABLE 1

HARQ feedback bit concatenation
(more than one component carrier group)

| Component carrier group1 | | | | Component carrier group 2 | | | |
|---|---|---|---|---|---|---|---|
| Component carrier 1 | | Component carrier 2 | | Component carrier 1 | | Component carrier 2 | |
| Codeword/ code block 1 | Codeword/ code block 2 | Codeword/ code block 1 | Codeword/ code block 2 | Codeword/ code block 1 | Codeword/ code block 2 | Codeword/ code block 1 | Codeword/ code block 2 |

For HARQ feedback bits corresponding to one component carrier, HARQ feedback bits corresponding to codewords associated with lower codeword indices in a given component carrier precede HARQ feedback bits corresponding to codewords associated with higher codeword indices in the given component carrier. For HARQ feedback bits corresponding to one codeword, HARQ feedback bits corresponding to code blocks and/or code block groups associated with lower code block and/or code block group indices in a given codeword precede HARQ feedback bits corresponding to code blocks and/or code block groups associated with higher code block and/or code block group indices in the given codeword. Table 2 includes rules for HARQ feedback bit concatenation in virtual carrier aggregation with indices for different component carriers, codewords, and code blocks.

TABLE 2

HARQ feedback bit concatenation
(one component carrier group)

| Component carrier 1 | | Component carrier 2 | |
|---|---|---|---|
| Codeword/ code block 1 | Codeword/ code block 2 | Codeword/ code block 1 | Codeword/ code block 2 |

Figure 11:
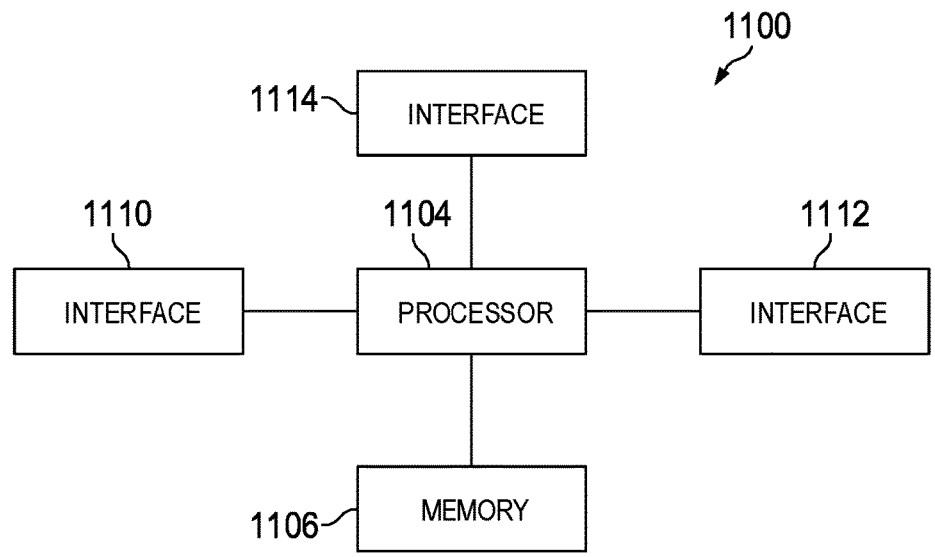
FIG. 11 is a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
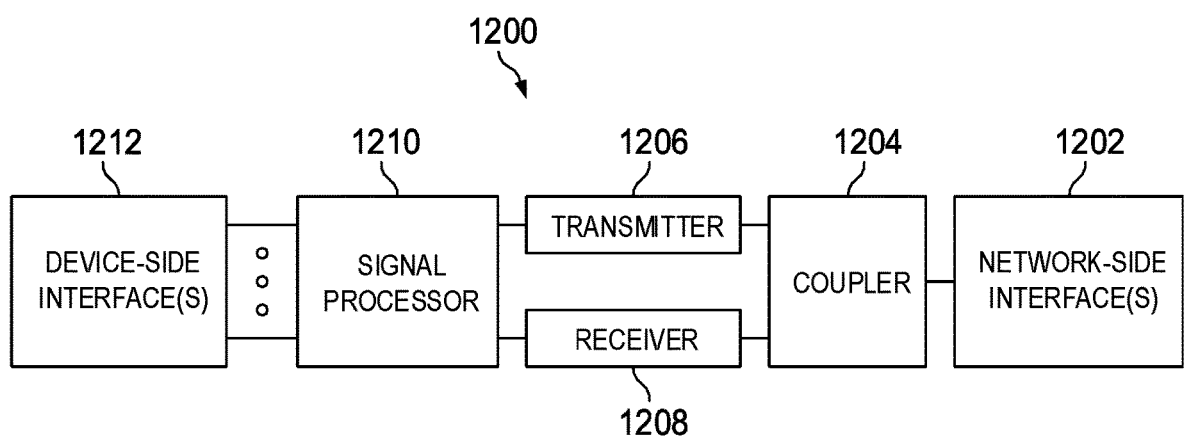
FIG. 12 is a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., downconverter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed is:

1. A method for receiving data, the method comprising:
   receiving, by a user equipment (UE) from a cell associated with a same physical cell ID (PCI), a first data stream over a physical component carrier and a second data stream over a virtual component carrier using a carrier aggregation scheme,
   wherein the physical component carrier and the virtual component carrier have a same carrier frequency and a same carrier bandwidth, the physical component carrier and the virtual component carrier belong to a same component carrier group and are assigned different carrier indices, carrier aggregation of the physical component carrier and the virtual component carrier is achieved by the physical component carrier and the virtual component carrier having the same PCI and by the physical component carrier and the virtual component carrier being associated with at least one common sublayer of a common media access control (MAC) sublayer of the UE, a common radio link control (RLC) sublayer of the UE, or a common packet data convergence protocol (PDCP) sublayer of the UE.

2. The method of claim 1, wherein the physical component carrier and the virtual component carrier are associated with a same timing advance group (TAG).

3. The method of claim 1, wherein the physical component carrier and the virtual component carrier are associated with a same cyclic prefix (CP) duration.

4. The method of claim 1, wherein the physical component carrier and the virtual component carrier are associated with a same sub-carrier spacing.

5. The method of claim 1, wherein the physical component carrier and the virtual component carrier are associated with a same bandwidth partition.

6. The method of claim 1, wherein a frame communicated over the physical component carrier is aligned in a time domain with a frame communicated over the virtual component carrier.

7. The method of claim 6, wherein subframes in the frame communicated over the physical component carrier are aligned in the time domain with subframes in the frame communicated over the virtual component carrier, the frame communicated over the physical component carrier carrying a same number of subframes as the frame communicated over the virtual component carrier, wherein pairs of subframes, transmitted over respective physical and virtual component carriers, that align in the time domain are associated with a same subframe index.

8. The method of claim 6, wherein at least one of a physical downlink control channel (PDCCH), a physical downlink shared channel (PDSCH), a physical uplink control channel (PUCCH), and a physical uplink shared channel (PUSCH) in the frame communicated over the physical component carrier has a different duration than corresponding one of a PDCCH, a PDSCH, a PUCCH, and a PUSCH in the frame communicated over the virtual component carrier.

9. The method of claim 6, wherein a last symbol of a physical downlink control channel (PDCCH) in the frame communicated over physical component carrier does not align in the time domain with the last symbol of a PDCCH in the frame communicated over the virtual component carrier.

10. The method of claim 6, wherein at least one of a first symbol and a last symbol of a physical downlink shared channel (PDSCH) in the frame communicated over the physical component carrier does not align in the time domain with a corresponding one of a first symbol and a last symbol of a PDSCH in the frame communicated over the virtual component carrier.

11. The method of claim 6, wherein at least one of a first symbol and a last symbol of a physical uplink control channel (PUCCH) in the frame communicated over the physical component carrier does not align in the time domain with a corresponding one of a first symbol and a last symbol of a PUCCH in the frame communicated over the virtual component carrier.

12. The method of claim 6, wherein at least one of a first symbol and a last symbol of a physical uplink shared channel (PUSCH) in the frame communicated over the physical component carrier does not align in the time domain with a corresponding one of a first symbol and a last symbol of a PUSCH in the frame communicated over the virtual component carrier.

13. The method of claim 6, wherein the frame communicated over the physical component carrier and the frame communicated over the virtual component carrier share a common downlink synchronization channel (SCH).

14. The method of claim 6, wherein the frame communicated over the physical component carrier and the frame communicated over the virtual component carrier share a common physical broadcast channel (PBCH).

15. The method of claim 6, wherein the frame communicated over the physical component carrier and the frame communicated over the virtual component carrier share a common search space in a physical downlink control channel (PDCCH).

16. The method of claim 6, wherein the frame communicated over the physical component carrier and the frame communicated over the virtual component carrier share a downlink control information (DCI) message without blind detection.

17. The method of claim 6, further comprising:
    decoding, by the UE, a downlink control information (DCI) message carried by the frame communicated over the physical component carrier, the DCI message indicating a starting or ending symbol location for at least one of a physical downlink control channel (PDCCH), a physical downlink shared channel (PDSCH), a physical uplink control channel (PUCCH), and a physical uplink shared channel (PUSCH) in the frame communicated over the physical component carrier; and
    determining that the starting or ending symbol location indicated by the DCI message carried by the frame communicated over the physical component carrier also indicates a starting or ending symbol location for at least one of a PDCCH, a PDSCH, a PUCCH, and a PUSCH in the frame communicated over the virtual component carrier when the starting or ending symbol location for a corresponding one of the PDCCH, the PDSCH, the PUCCH, and the PUSCH in the frame communicated over the virtual component carrier has not been configured via higher layer signaling.

18. The method of claim 6, wherein the UE does not receive an uplink grant for resources in a physical uplink shared channel (PUSCH) of the frame communicated over the virtual component carrier.

19. The method of claim 1, wherein the physical component carrier has an associated first maximum number of HARQ processes, independently of a number of active HARQ processes in the virtual component carrier, and the virtual component carrier has an associated second maximum number of HARQ processes, independently of a number of active HARQ processes in the physical component carrier.

20. The method of claim 1, further comprising:
    transmitting a single physical uplink control channel (PUCCH) message, the single PUCCH message including at least a first HARQ feedback bit indicating whether a codeword or code block carried by the first data stream was successfully decoded by the UE, and at least a second HARQ feedback bit indicating whether a codeword and/or code block carried by the second data stream was successfully decoded by the UE.

21. The method of claim 20, wherein a total number of HARQ feedback bits in the single PUCCH message is based on a combined number of codewords and/or code blocks carried by data streams received over component carriers in a group of component carriers that includes the physical component carrier and the virtual component carrier.

22. The method of claim 20, wherein a total number of HARQ feedback bits in the single PUCCH message is configured via higher layer signaling.

23. The method of claim 20, wherein a resource of the PUCCH is configured by RRC signaling.

24. The method of claim 1, further comprising:
    descrambling a first message carried by the first data stream according to a scrambling identity associated with the same PCI assigned to the physical component carrier; and
    descrambling a second message carried by the second data stream using either the scrambling identity associated with the same PCI or a scrambling identity configured through higher layer signaling.

25. The method of claim 1, wherein the first data stream is orthogonal to the second data stream in a code domain.

26. The method of claim 1, wherein the physical component carrier and the virtual component carrier are associated with two different sublayers, the different sublayers being one of two different MAC sublayers, two different RLC sublayers, or two different PDCP sublayers, and wherein the two different sublayers are at a different sublayer level than the at least one common sublayer.

27. A user equipment (UE) comprising:
    at least one processor; and
    a non-transitory computer readable storage medium storing programming for execution by the at least one processor, the programming including instructions to cause the UE to:
        receive, from a cell associated with a same physical cell ID (PCI), a first data stream over a physical component carrier and a second data stream over a virtual component carrier using a carrier aggregation scheme,
    wherein the physical component carrier and the virtual component carrier have a same carrier frequency and a same carrier bandwidth, the physical component carrier and the virtual component carrier belong to a same component carrier group and are assigned different carrier indices, carrier aggregation of the physical component carrier and the virtual component carrier is achieved by the physical component carrier and the virtual component carrier having the same PCI and by the physical component carrier and the virtual component carrier being associated with at least one common sublayer of a common media access control (MAC) sublayer of the UE, a common radio link control (RLC) sublayer of the UE, or a common packet data convergence protocol (PDCP) sublayer of the UE.

* * * * *